United States Patent
Suzuki et al.

(10) Patent No.: US 8,690,757 B2
(45) Date of Patent: Apr. 8, 2014

(54) ENDOSCOPE APPARATUS

(75) Inventors: Takashi Suzuki, Chofu (JP); Mitsuo Obata, Hino (JP)

(73) Assignee: Olympus Corporation, Tokyo (JP)

( * ) Notice: Subject to any disclaimer, the term of this patent is extended or adjusted under 35 U.S.C. 154(b) by 1350 days.

(21) Appl. No.: 12/026,157

(22) Filed: Feb. 5, 2008

(65) Prior Publication Data

US 2008/0228036 A1    Sep. 18, 2008

(30) Foreign Application Priority Data

Feb. 28, 2007 (JP) .................................. 2007-050633
May 21, 2007 (JP) .................................. 2007-134633

(51) Int. Cl.
*A61B 1/04* (2006.01)
*A61B 1/00* (2006.01)

(52) U.S. Cl.
USPC ............ 600/109; 600/102; 600/132; 600/136

(58) Field of Classification Search
USPC ......... 600/102, 127, 132, 136, 112, 152, 109, 600/118, 131; 356/241.1
See application file for complete search history.

(56) References Cited

U.S. PATENT DOCUMENTS

| | | | | |
|---|---|---|---|---|
| 5,630,782 A | * | 5/1997 | Adair | 600/133 |
| 6,793,622 B2 | | 9/2004 | Konomura | |
| 6,846,285 B2 | * | 1/2005 | Hasegawa et al. | 600/102 |
| 7,128,709 B2 | * | 10/2006 | Saruya | 600/132 |
| 2004/0158128 A1 | * | 8/2004 | Fujikawa et al. | 600/132 |
| 2009/0147251 A1 | | 6/2009 | Suzuki | |

FOREIGN PATENT DOCUMENTS

| | | |
|---|---|---|
| JP | 2003-153853 A | 5/2003 |
| JP | 2003-217734 | 7/2003 |
| JP | 2004-126570 | 4/2004 |
| JP | 2005-046318 A | 2/2005 |
| JP | 2006-218203 A | 8/2006 |

* cited by examiner

*Primary Examiner* — Alireza Nia
(74) *Attorney, Agent, or Firm* — Scully, Scott, Murphy & Presser, PC

(57) ABSTRACT

An endoscope apparatus includes an apparatus main body having a housing with a concave portion formed in one surface, and an endoscope unit including a detachable connector portion in the concave portion, wherein, when the connector portion is mounted to the concave portion, the connector portion constitutes a part of the one surface. More preferably, a packing is provided in the housing or the connector portion that, when the connector portion is mounted to the housing, retains the mutual mating surfaces of the housing and the connector portion in a closely contacting state.

21 Claims, 20 Drawing Sheets

ENDOSCOPE APPARATUS

CROSS REFERENCE TO RELATED APPLICATION

This application claims benefit of Japanese Applications No. 2007-050633 filed on Feb. 28, 2007 and No. 2007-134633 filed on May 21, 2007 the contents of which are incorporated by this reference.

BACKGROUND OF THE INVENTION

1. Field of the Invention

The present invention relates to an endoscope apparatus in which an endoscope is detachable from the apparatus main body.

2. Description of the Related Art

It is well-known that endoscope apparatuses are widely utilized in the medical care field and industrial field. In the case of an endoscope apparatus used for medical care, it is possible to observe inside a body cavity by inserting a long and thin insertion portion of the endoscope into the body cavity and, as required, perform various kinds of treatment using a treatment instrument that is inserted into an insertion channel for a treatment instrument.

In the case of an endoscope apparatus used in the industrial field, by inserting a long and thin insertion portion of the endoscope inside a jet engine or piping at a factory or the like, it is possible to observe damage or corrosion and the like at a site to be inspected and to perform various kinds of corrective treatment.

An endoscope apparatus generally includes an endoscope having a long and thin insertion portion in which, for example, an image pickup unit having an image pickup device such as a lens or CCD is disposed at the distal end thereof, and an apparatus main body to which the endoscope is connected. In the case of small size endoscope apparatuses, an apparatus is known in which a light source such as an LED is arranged at the distal end of the insertion portion.

Various members that drive the endoscope are arranged inside the apparatus main body. More specifically, these include an electric circuit that drives an image pickup unit and a light source, an image processing unit that, after images are picked up, processes image signals outputted from the image pickup unit, a recording medium that records image data processed by the image processing unit, and a battery or the like that supplies power to the endoscope and the apparatus main body.

With respect to this kind of endoscope apparatus, an endoscope apparatus has been disclosed in, for example, Japanese Patent Application Laid-Open Publication No. 2004-126570, that includes a monitor, and in which a lamp housing of a power supply unit serving as the apparatus main body and a base unit of the endoscope can be detached from each other. In order to reliably make a connection with a light guide connector or an electric connector or the like, this endoscope apparatus has a lock member that is inserted into a guide pin bracket member of the lamp housing on a connection surface of the base unit that contacts against the lamp housing, and a slider member that is engageably inserted into a guide rail of the lamp housing on the side surface.

The apparatus main body of this endoscope apparatus is provided with various connectors for connecting an external power source or external devices, and an electrical connector portion such as a housing portion for electrically connecting to and housing a storage medium.

In addition to use within a room in which there is dust and moisture and the like, this kind of endoscope apparatus is also used outdoors, and in some cases is used in a location that is exposed to dirt, rain, humidity and the like. Therefore, a structure that maintains a dust-proof property and a waterproof property of the various electrical connector portions described above is indispensable not just in this kind of endoscope apparatus for industrial use, but for various electronic devices.

With respect to technology for waterproof structures and dustproof structures for electronic device, for example, Japanese Patent Application Laid-Open Publication No. 2003-217734 discloses a waterproof cap structure including a hinge part that is arranged to independently cover each of two connector opening parts.

SUMMARY OF THE INVENTION

An endoscope apparatus includes an apparatus main body including a housing having a concave portion formed in one surface, and an endoscope unit including a detachable connector portion in the concave portion, wherein, when the connector portion is mounted to the concave portion, the connector portion constitutes a part of the one surface. More preferably, a packing that retains mutual mating surfaces of the housing and the connector portion in a closely contacting state when the connector portion is mounted in the housing, is provided in the housing or in the connector portion.

The above and other objects, features and advantages of the invention will become more clearly understood from the following description referring to the accompanying drawings.

DETAILED DESCRIPTION OF THE PREFERRED EMBODIMENTS

Hereunder, an embodiment of the present invention is described with reference to the drawings. The endoscope apparatus according to the present embodiment is described taking an example of a shoulder-type endoscope apparatus for industrial use that provides excellent portability.

Figure 1:
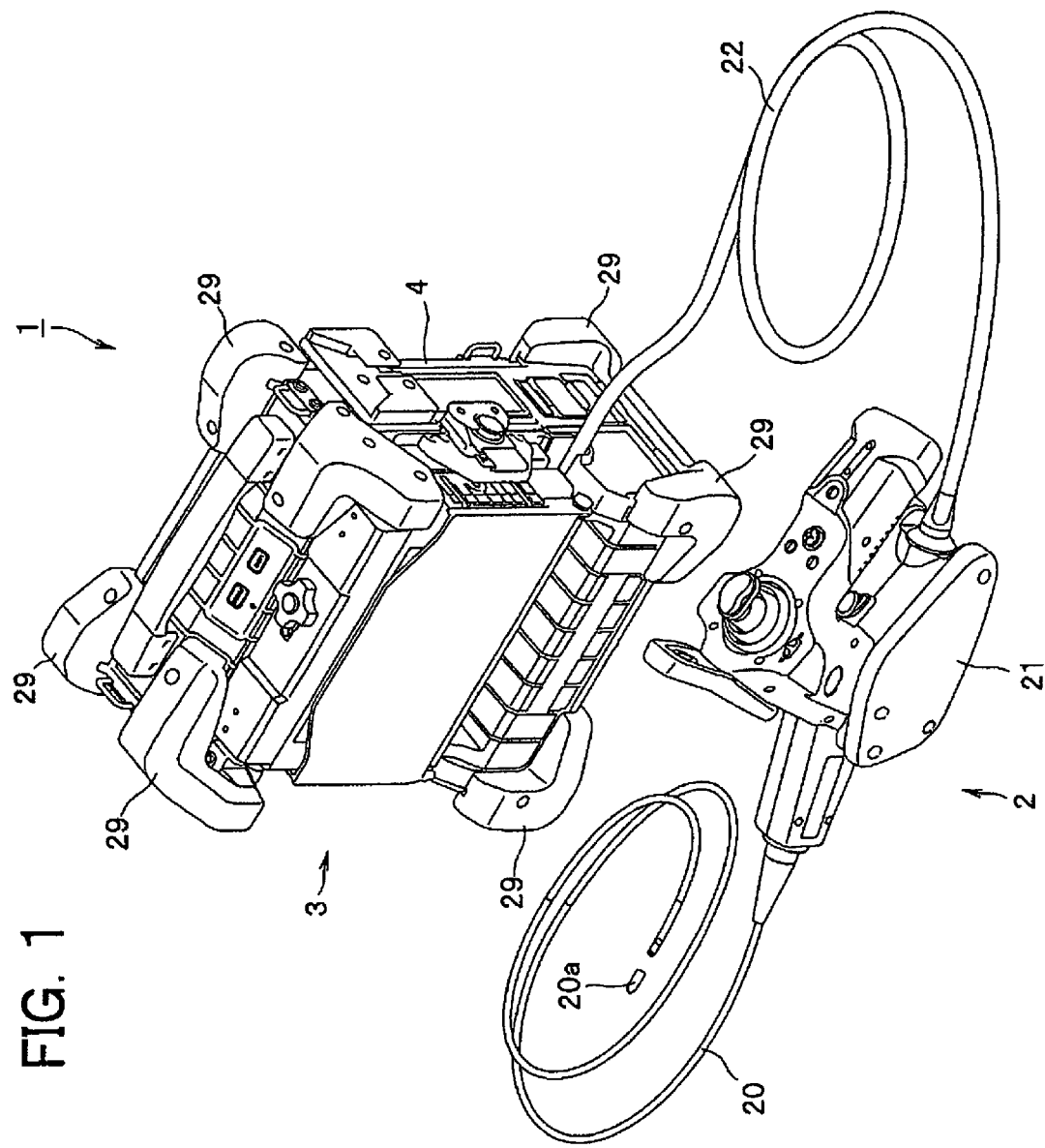
FIG. 1 is a perspective view that shows the overall configuration of an endoscope apparatus relating to one embodiment of the present invention.
Figure 2:
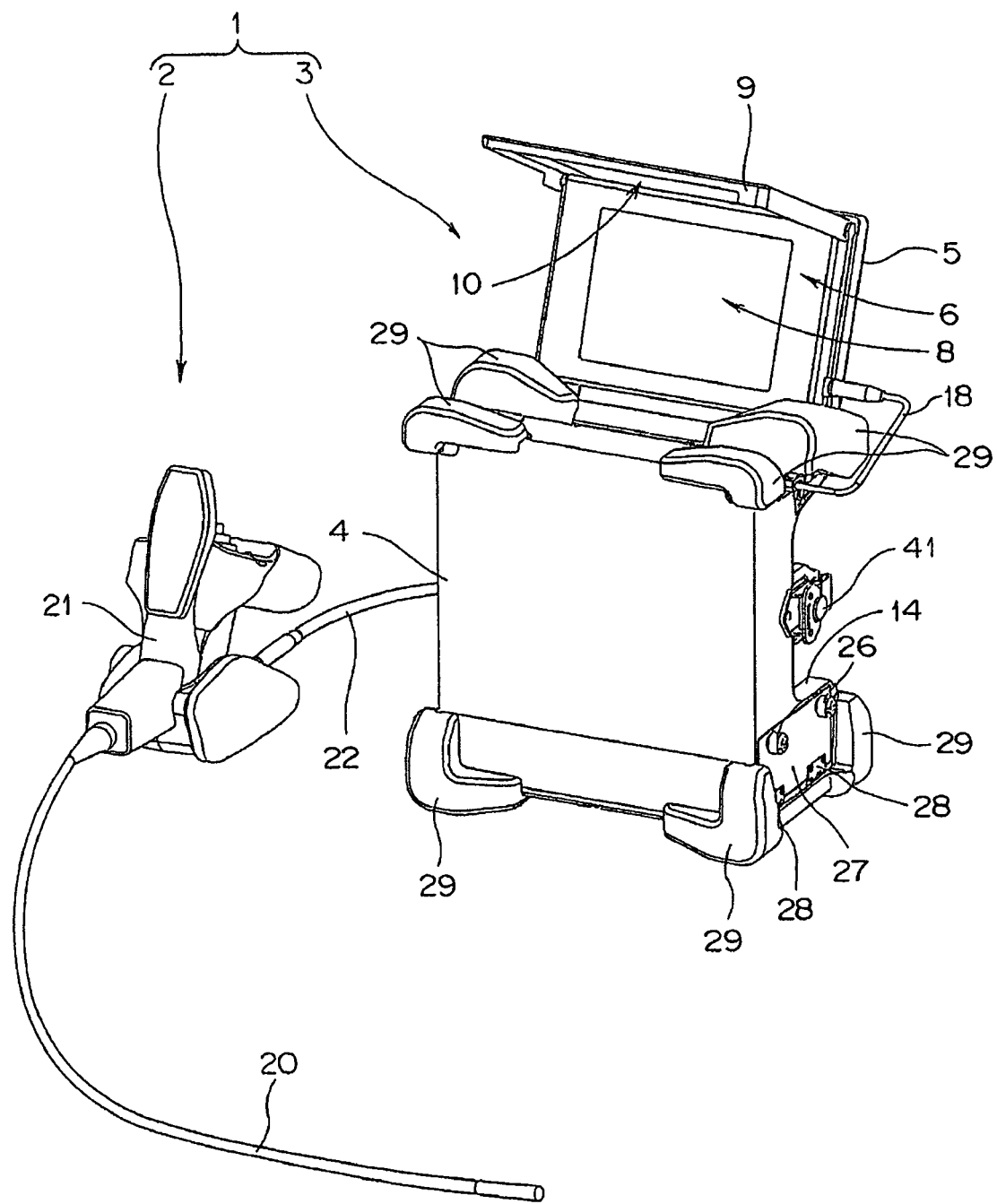
FIG. 2 is a perspective view of the endoscope apparatus in a state in which a monitor is rotated and raised up from an apparatus main body.
Figure 3:
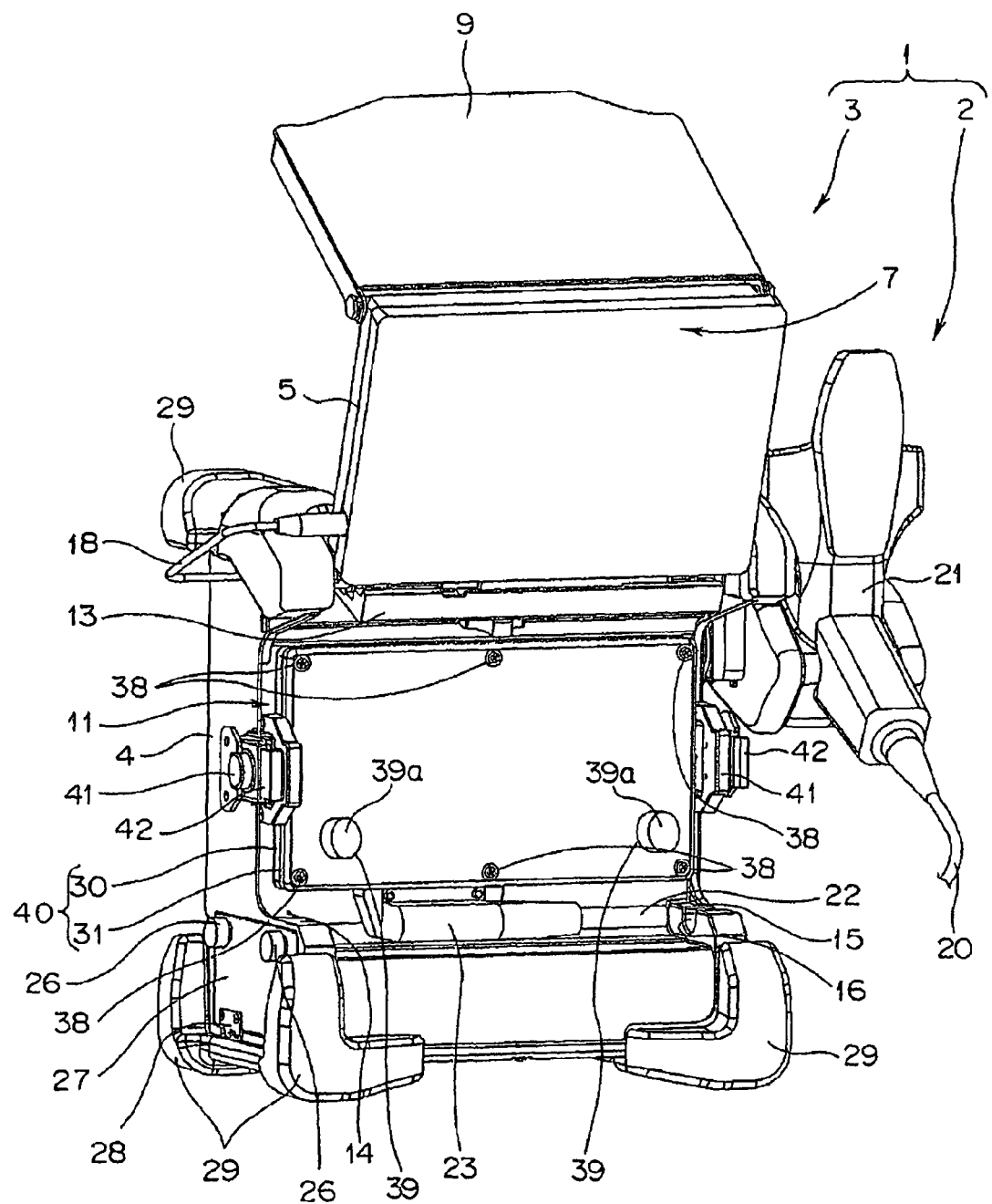
FIG. 3 is an enlarged perspective view of the apparatus main body of the endoscope apparatus shown in FIG. 2 as viewed from the back surface side.
Figure 4:
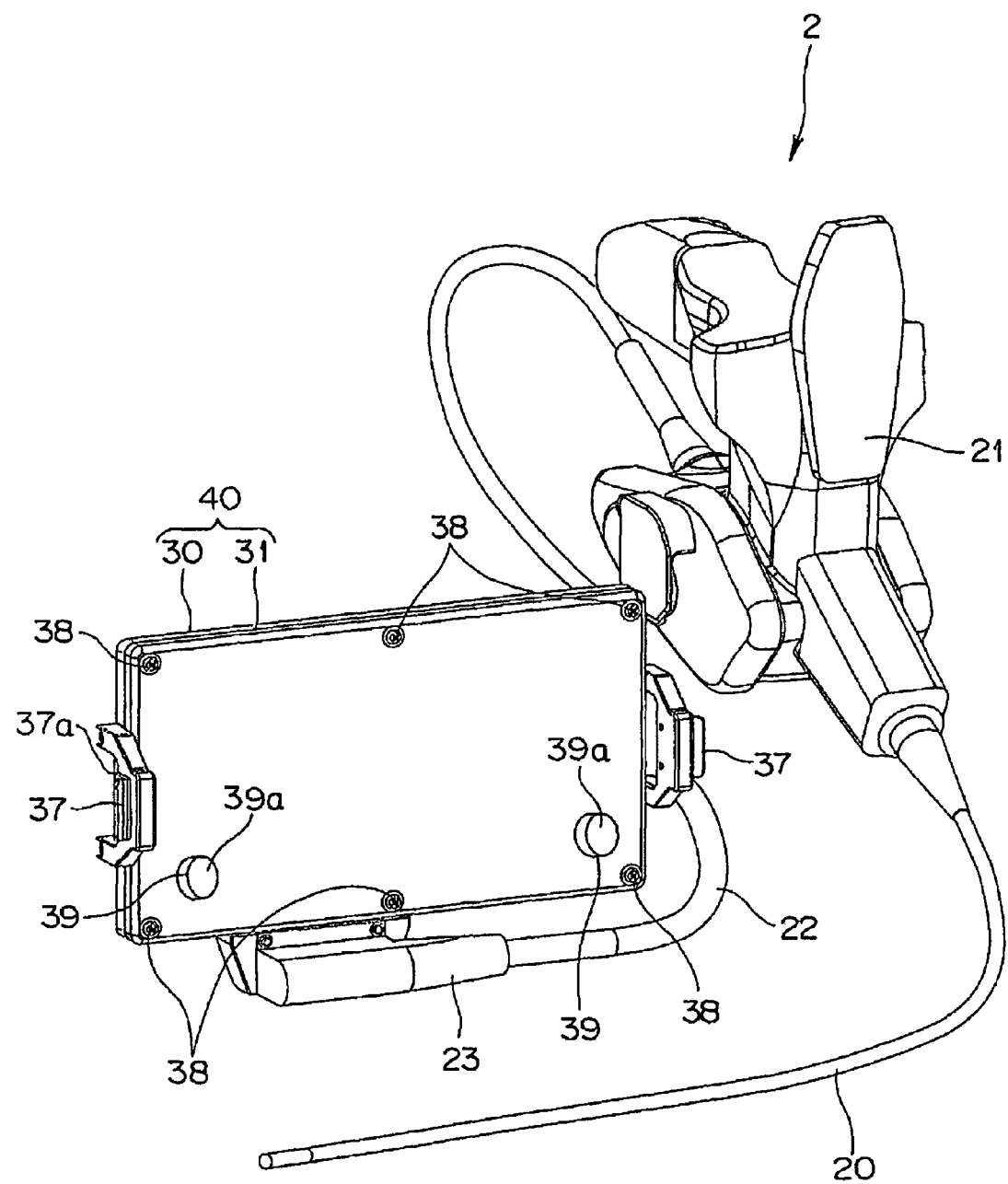
FIG. 4 is a perspective view of an endoscope in a state in which the endoscope is detached from the apparatus main body.
Figure 5:
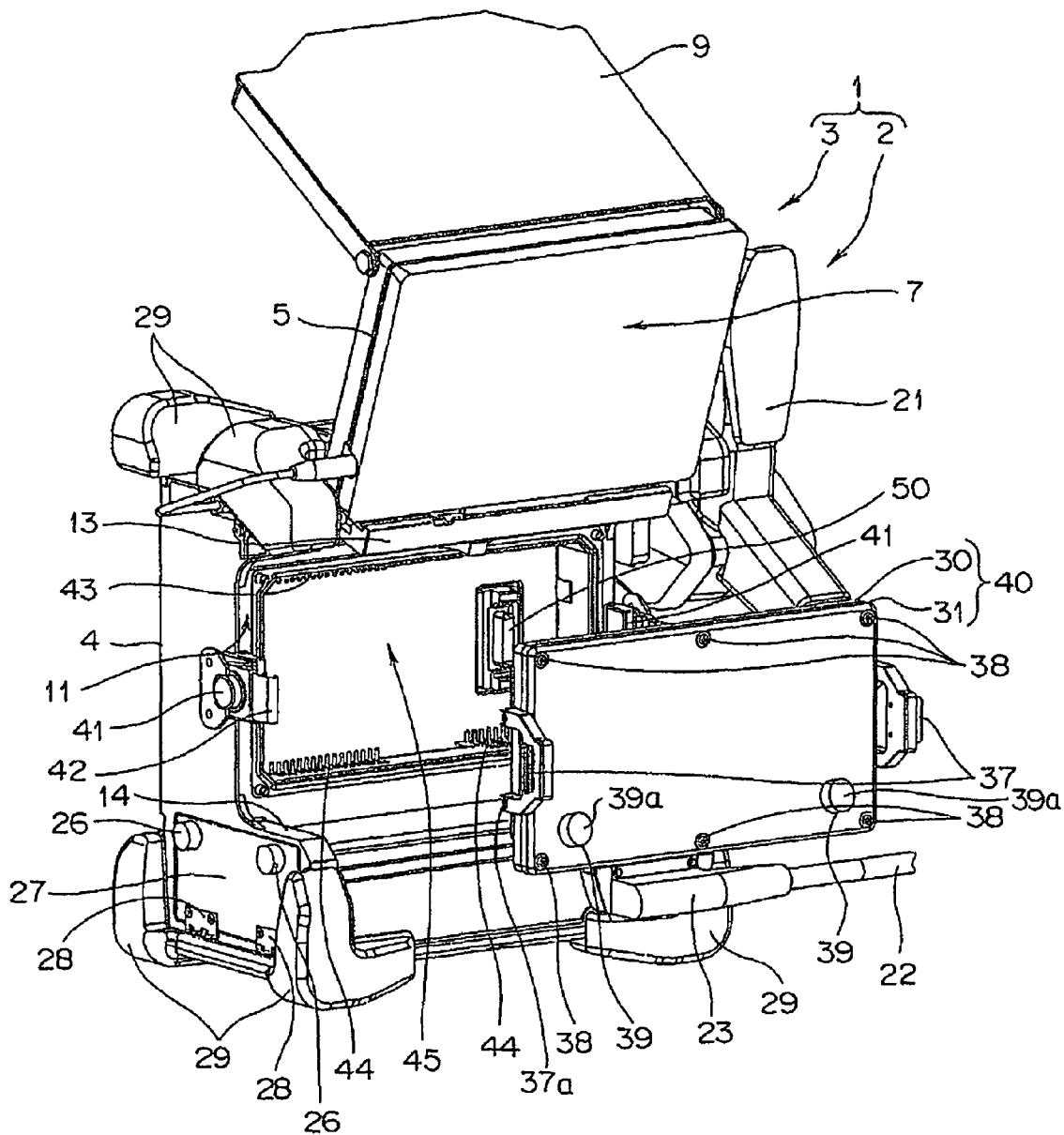
FIG. 5 is a perspective view illustrating a state in which a connector box of the endoscope is mounted in the apparatus main body of the endoscope apparatus.
Figure 6:
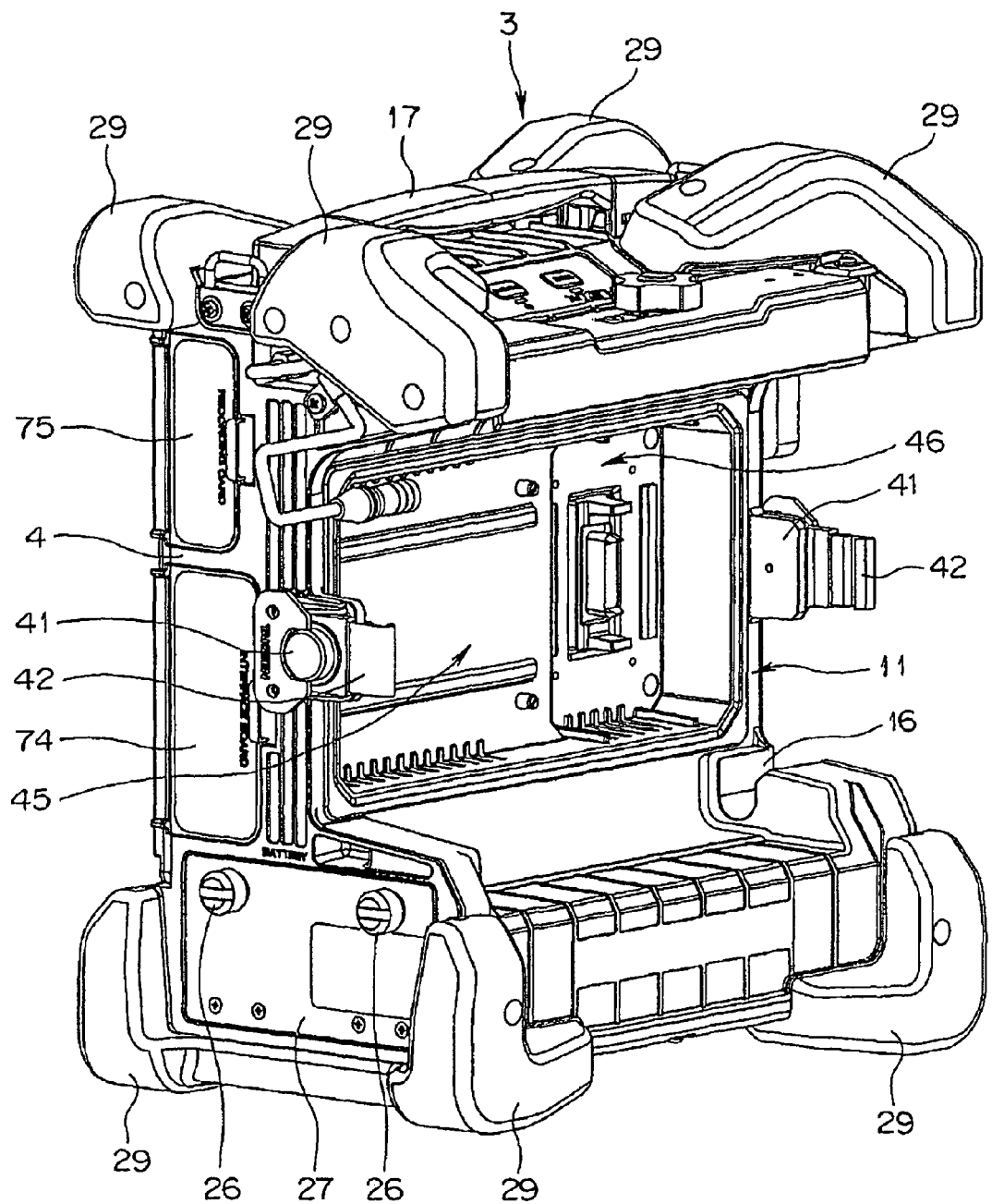
FIG. 6 is a perspective view of the apparatus main body from which the endoscope is detached.
Figure 7:
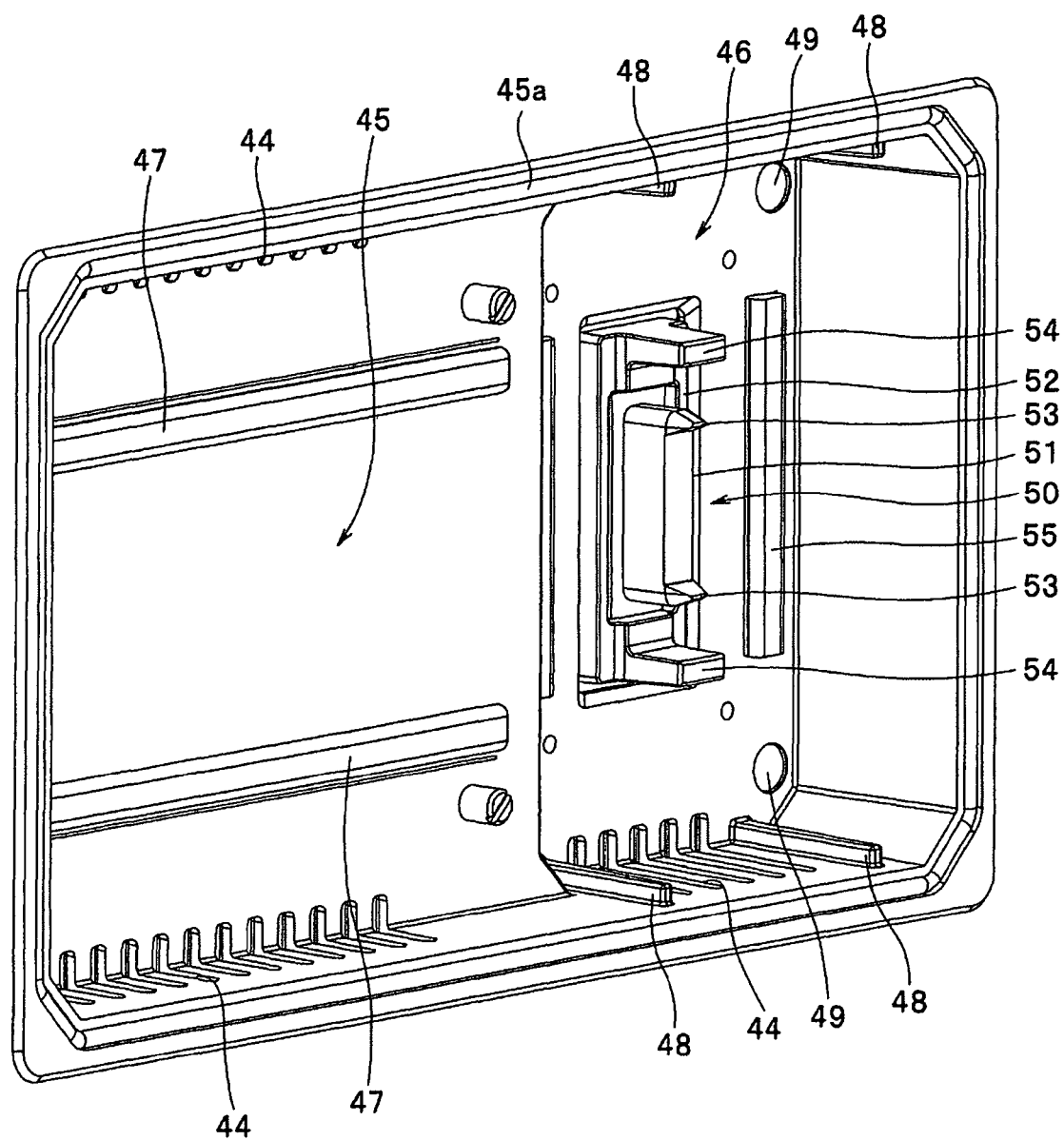
FIG. 7 is a perspective view illustrating a housing chamber of the apparatus main body that shows a state in which the connector box is detached therefrom.
Figure 8:
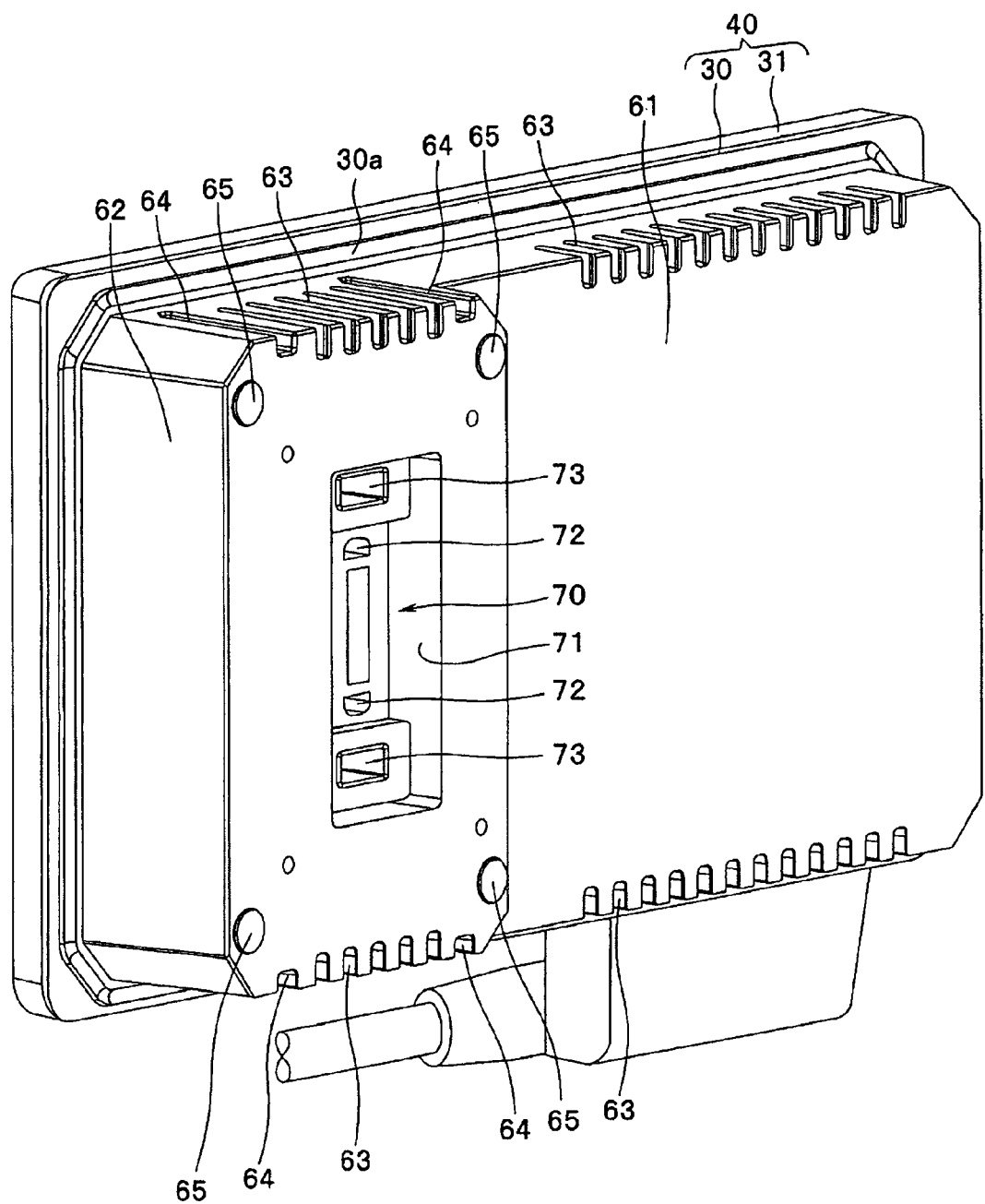
FIG. 8 is a perspective view that illustrates the back surface side of the connector box of the endoscope.
Figure 9:
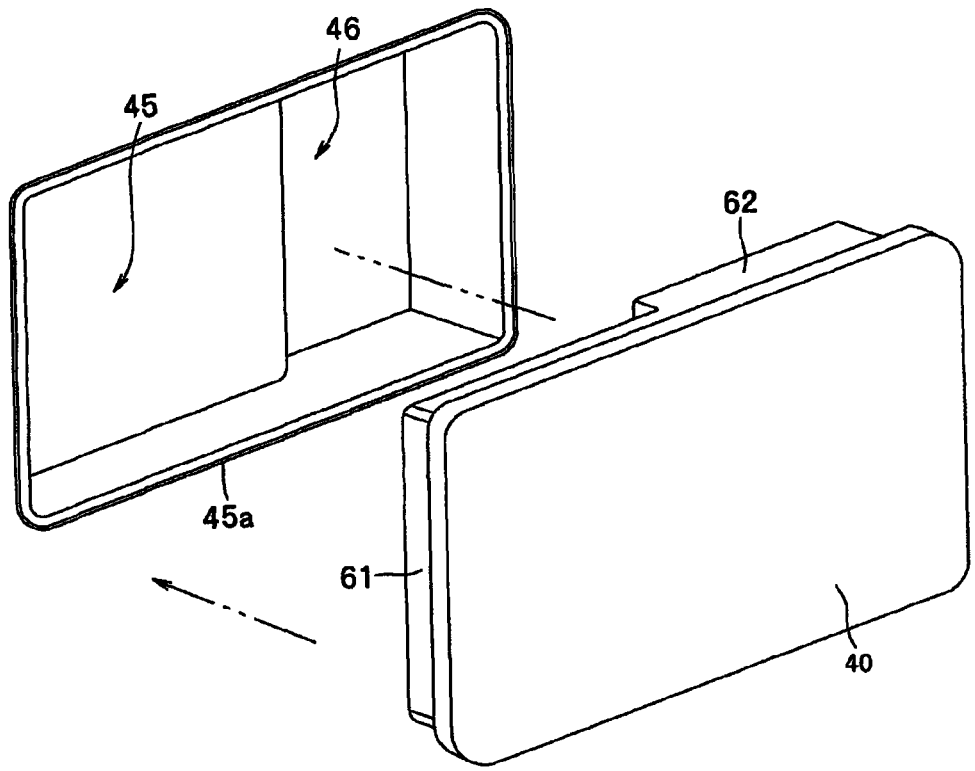
FIG. 9 is a schematic diagram that illustrates a state before connection of the housing chamber and the connector box.
Figure 10:
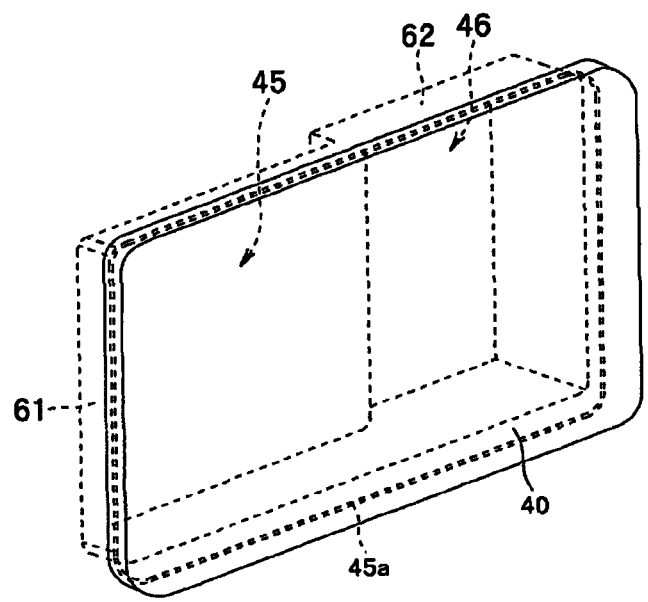
FIG. 10 is a schematic diagram that illustrates a state in which the housing chamber and the connector box are connected from the state shown in FIG. 9.
Figure 11:
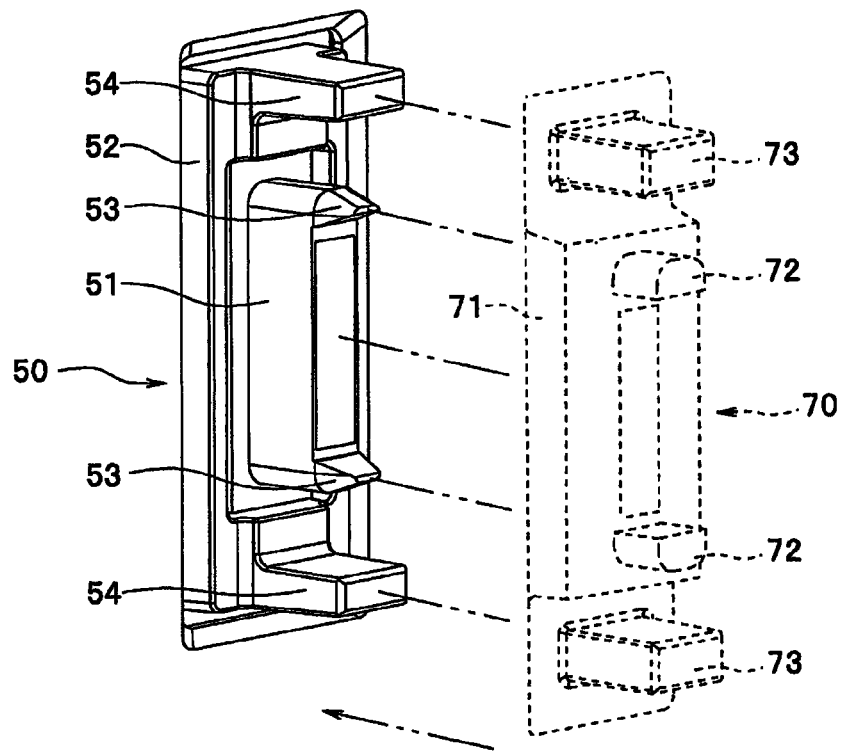
FIG. 11 is a perspective view showing a state before connection of a pair of electric connectors.
Figure 12:
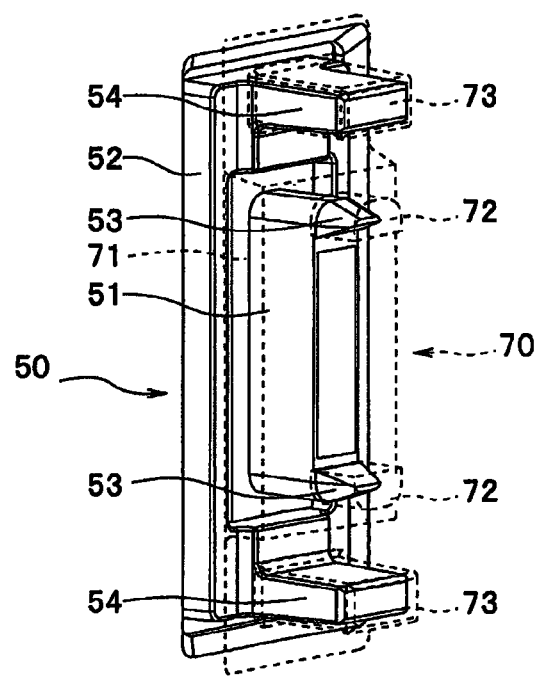
FIG. 12 is a perspective view showing a state in which the pair of electric connectors are connected from the state shown in FIG. 11.
Figure 13:
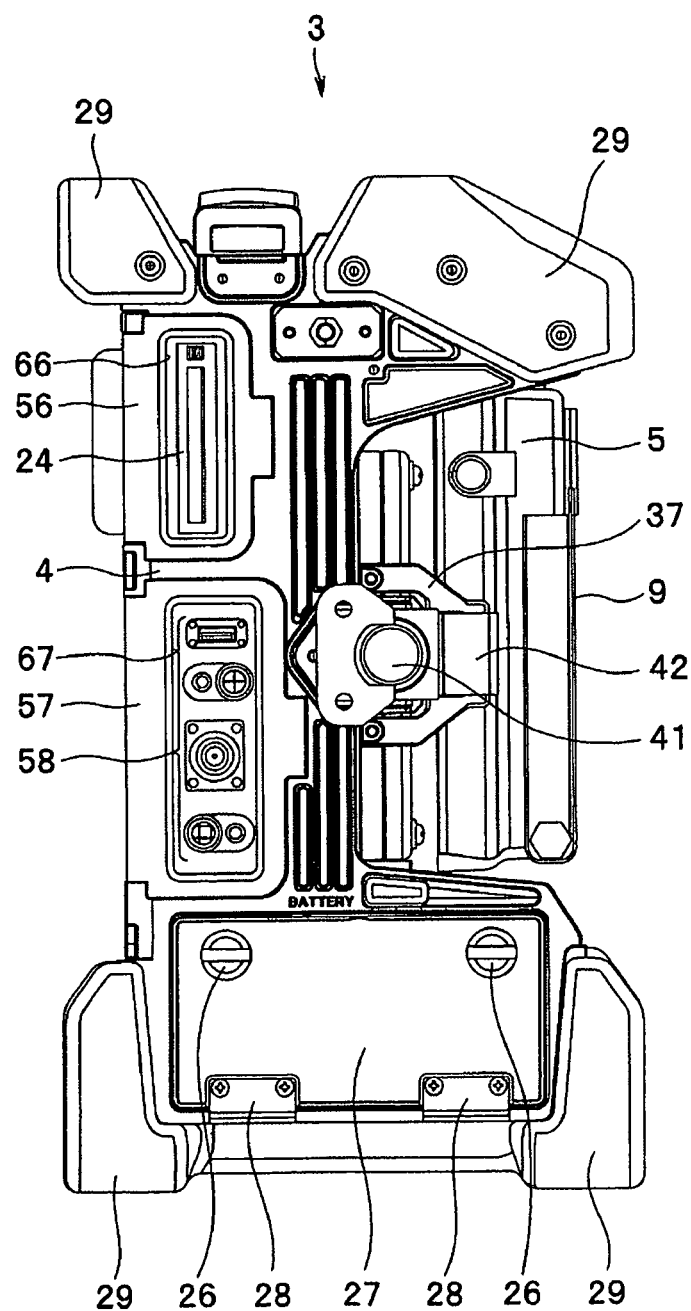
FIG. 13 is a right side view of the apparatus main body of the endoscope apparatus.
Figure 14:
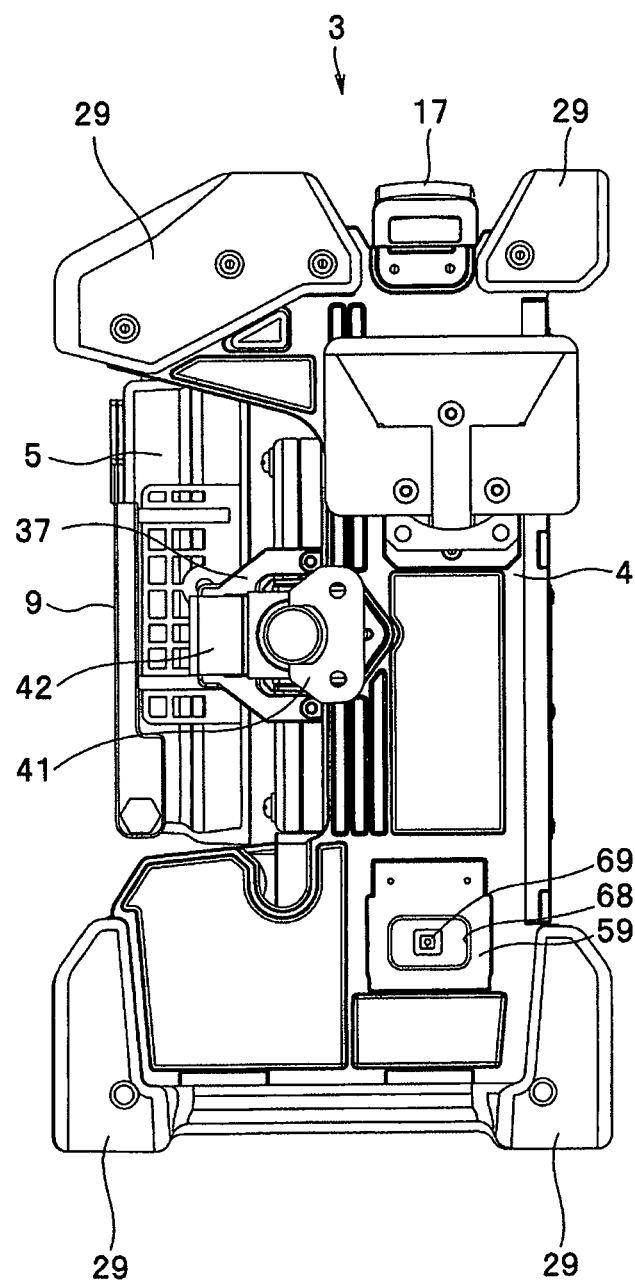
FIG. 14 is a left side view of the apparatus main body of the endoscope apparatus.
Figure 15:
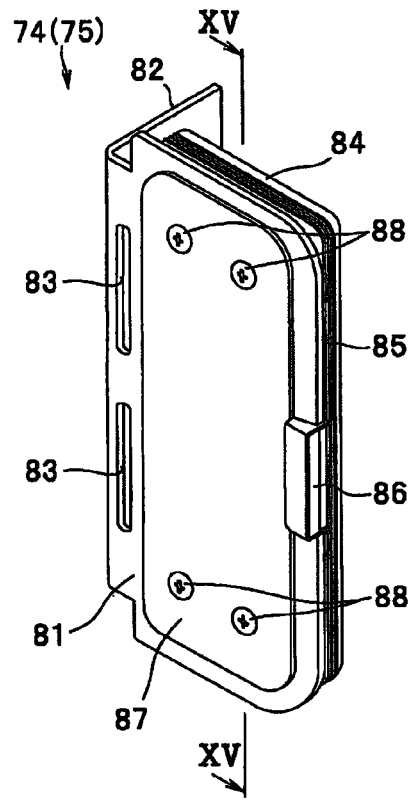
FIG. 15 is a perspective view showing the configuration of a connector cover on an electric connector side as viewed from the front surface side.
Figure 16:
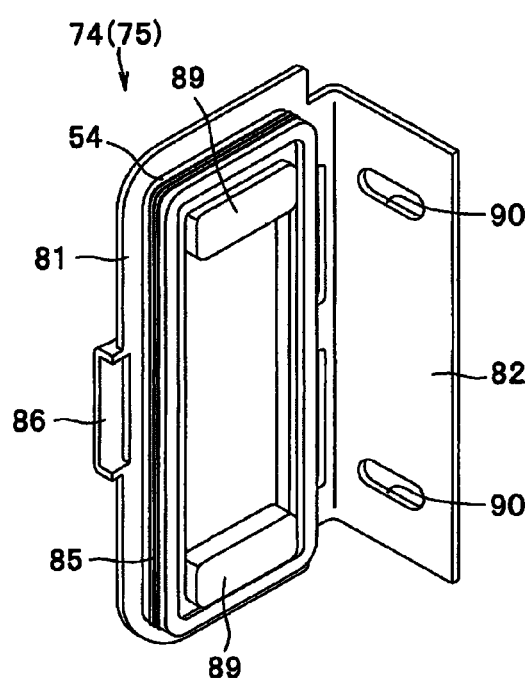
FIG. 16 is a perspective view showing the configuration of the connector cover on the electric connector side as viewed from the back surface side.
Figure 17:
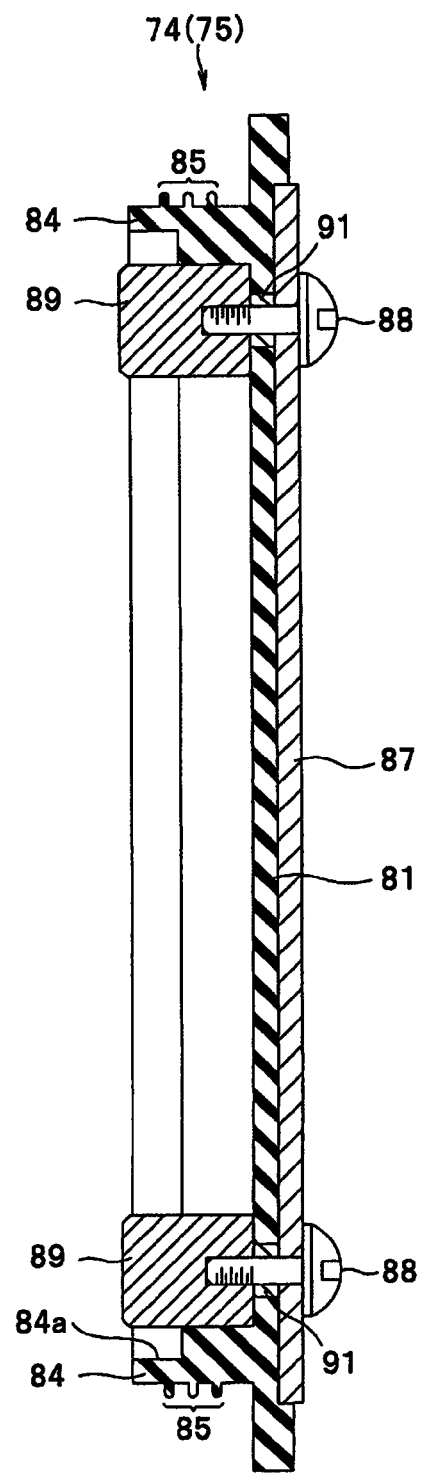
FIG. 17 is a sectional view of the connector cover along the line XVII-XVII shown in FIG. 15.
Figure 18:
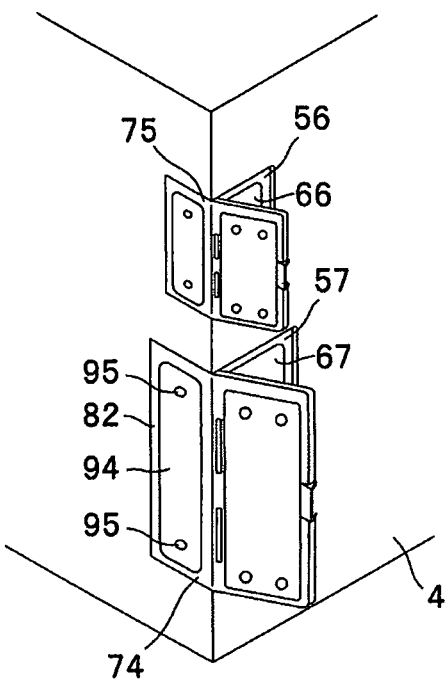
FIG. 18 is a perspective view showing a connector cover that is fixed to an exterior housing of the apparatus main body.
Figure 19:
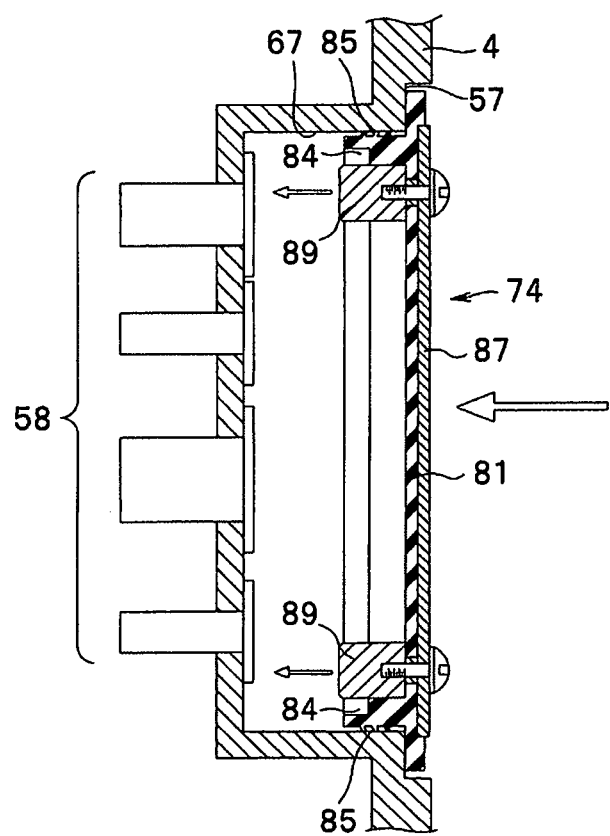
FIG. 19 is a sectional view showing a state in which the connector cover is engaged with a concave portion of an electric connection portion.
Figure 20:
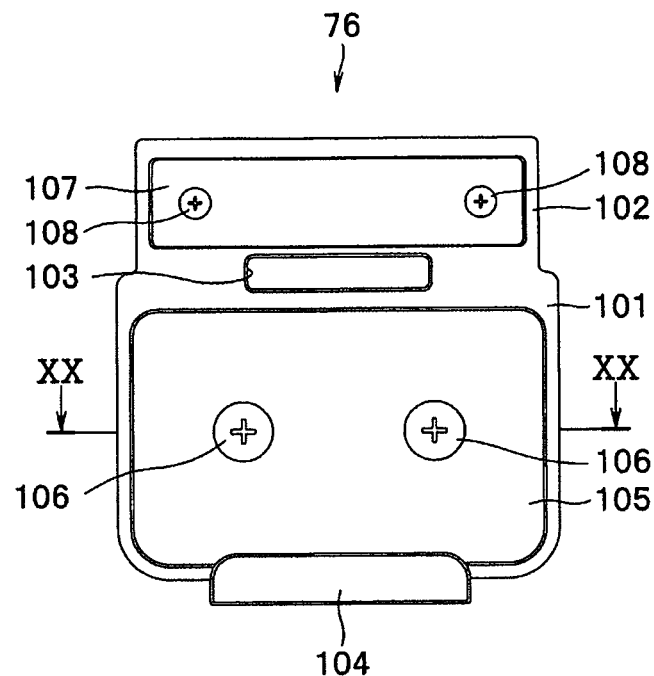
FIG. 20 is a plan view showing the configuration of a connector cover on a power source connector side as viewed from the front surface side.
Figure 21:
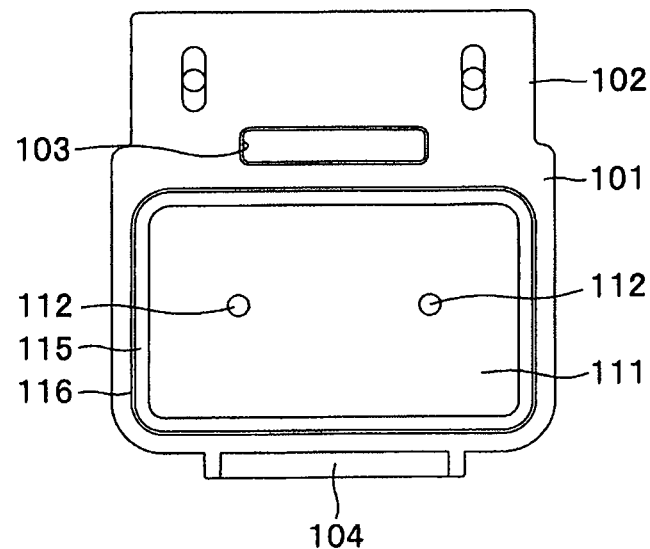
FIG. 21 is a plan view showing the configuration of the connector cover on a power source connector side as viewed from the back surface side.
Figure 22:
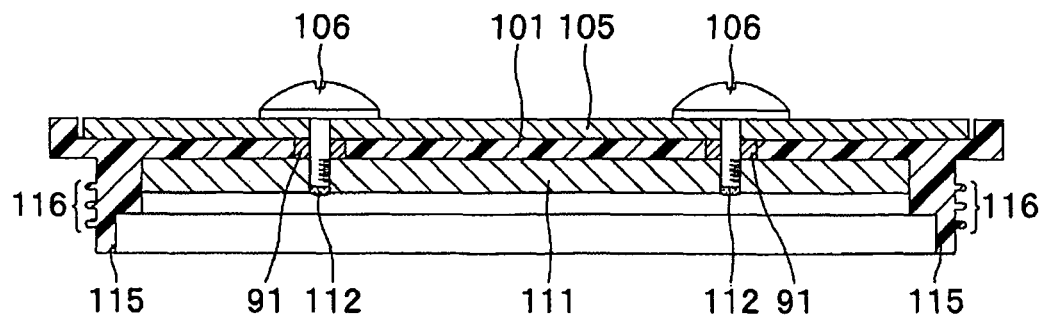
FIG. 22 is a sectional view of the connector cover that shows a section cut along a line XXII-XXII shown in FIG. 20.
Figure 23:
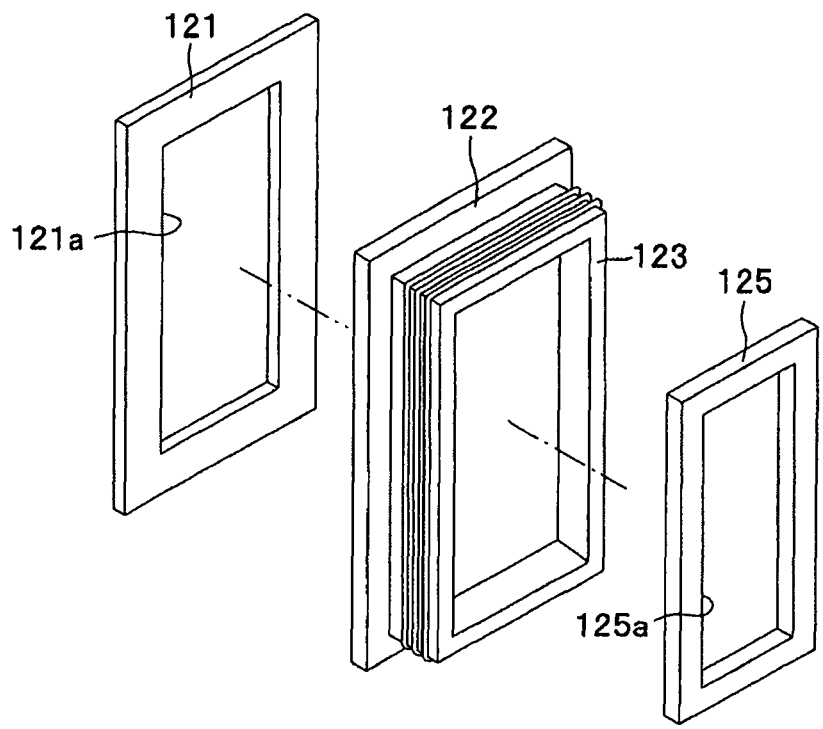
FIG. 23 is an exploded perspective view that shows the configuration of a connector cover according to a first modification example.
Figure 24:
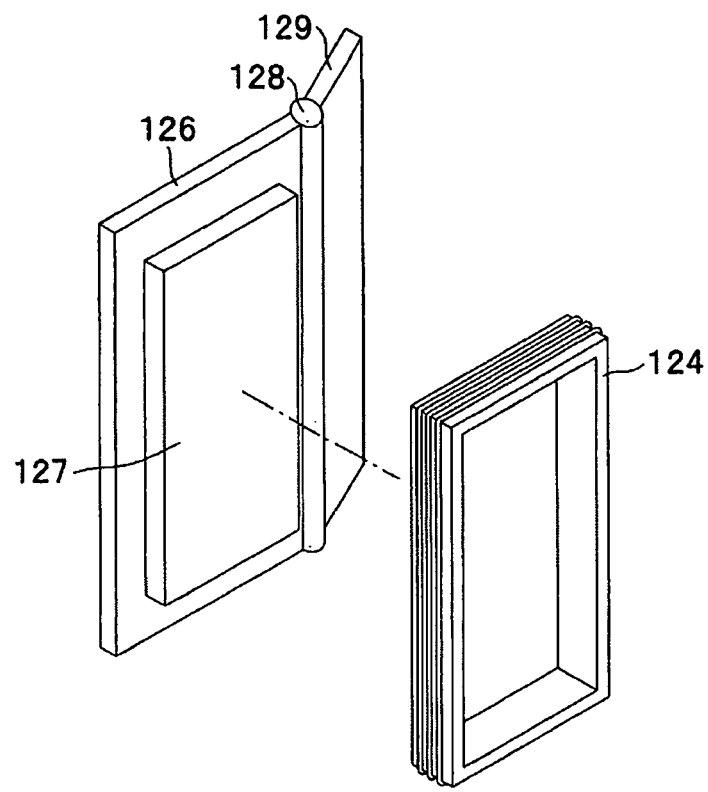
FIG. 24 is an exploded perspective view that shows the configuration of a connector cover according to a second modification example.
Figure 25:
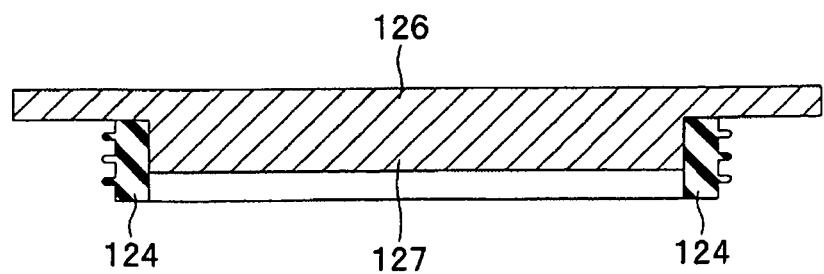
FIG. 25 is a sectional view in one direction of the connector cover shown in FIG. 24.
Figure 26:
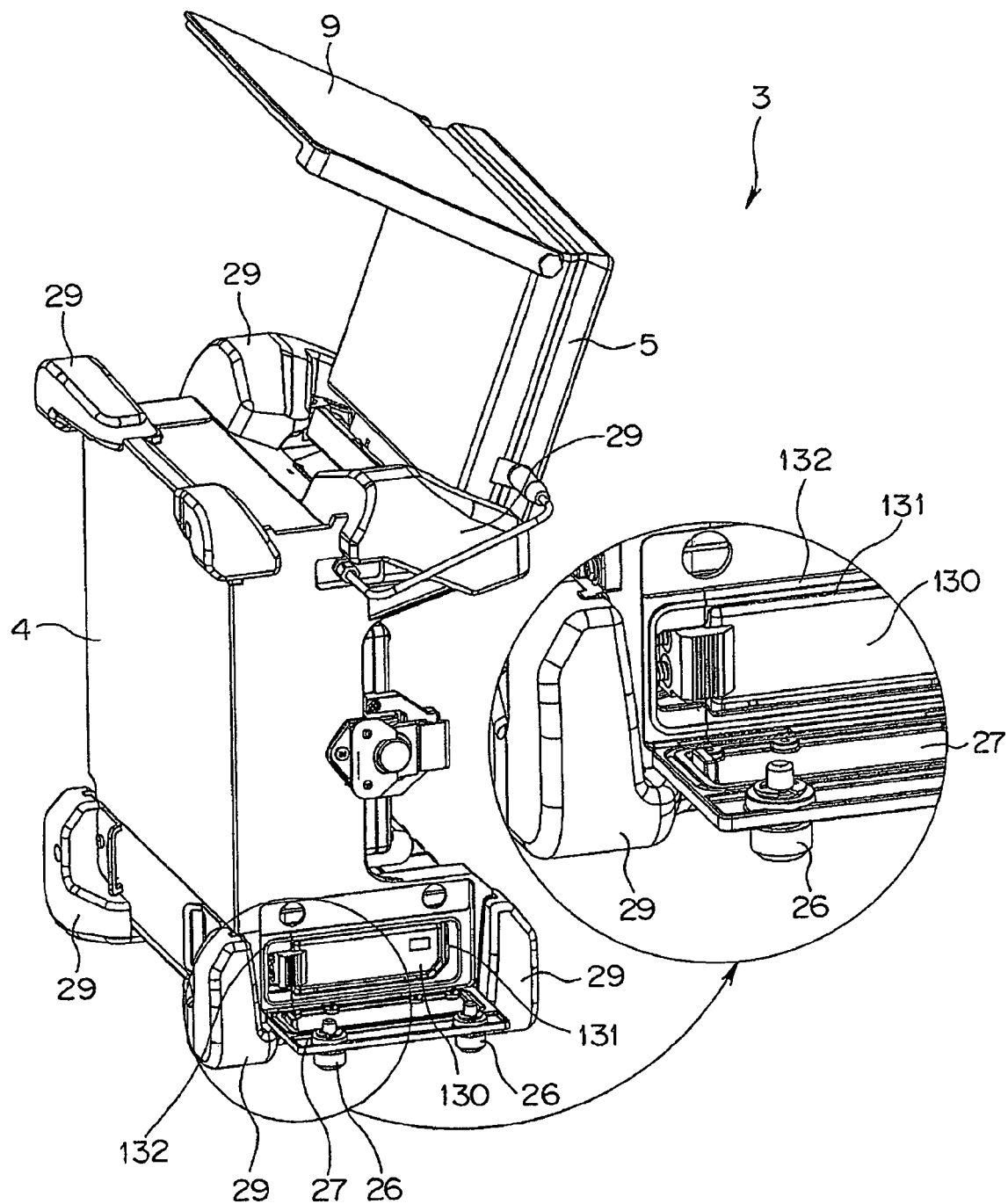
FIG. 26 is a perspective view of the apparatus main body of the endoscope apparatus showing a state in which a lid for a battery is open.
Figure 27:
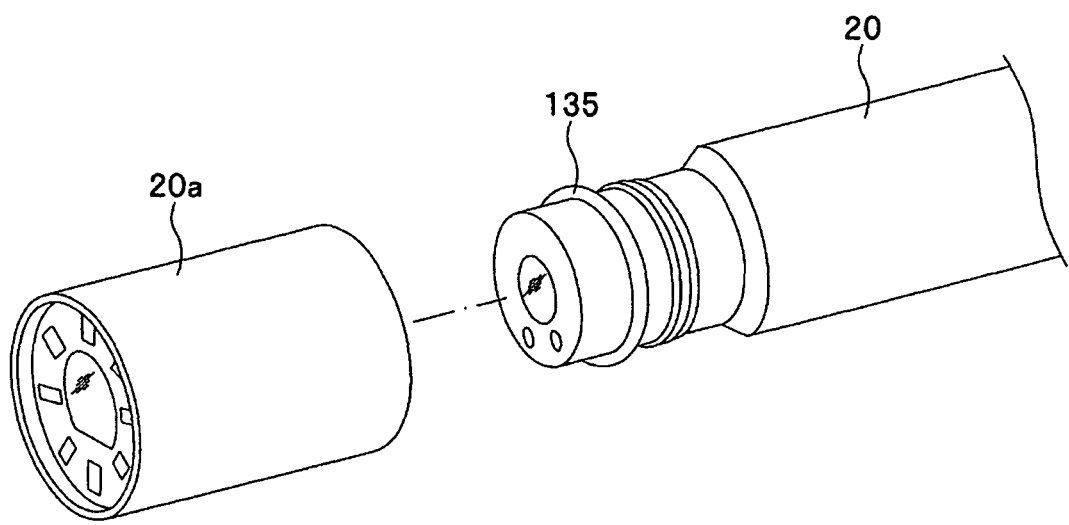
FIG. 27 is a perspective view that illustrates a distal end portion of an endoscope unit and a distal end adapter that is to be mounted on the distal end portion.

FIG. 1 to FIG. 27 relate to one embodiment of the present invention. FIG. 1 is a perspective view that shows the overall configuration of the endoscope apparatus. FIG. 2 is a perspective view of the endoscope apparatus in a state in which the monitor is rotated and raised up from the apparatus main body. FIG. 3 is an enlarged perspective view of the apparatus main body of the endoscope apparatus shown in FIG. 2 as viewed from the back surface side. FIG. 4 is a perspective view of the endoscope in a state in which the endoscope is detached from the apparatus main body. FIG. 5 is a perspective view illustrating a state in which a connector box of the endoscope is mounted in the apparatus main body of the endoscope apparatus. FIG. 6 is a perspective view of the apparatus main body from which the endoscope is detached. FIG. 7 is a perspective view illustrating a housing chamber of the apparatus main body that shows a state in which the connector box is detached therefrom. FIG. 8 is a perspective view that illustrates the back surface side of the connector box of the endoscope. FIG. 9 is a schematic diagram that illustrates a state before connection of the housing chamber and the connector box. FIG. 10 is a schematic diagram that illustrates a state in which the housing chamber and the connector box are connected from the state shown in FIG. 9. FIG. 11 is a perspective view showing a state before connection of a pair of electric connectors. FIG. 12 is a perspective view showing a state in which the pair of electric connectors are connected from the state shown in FIG. 11. FIG. 13 is a right side view of the apparatus main body of the endoscope apparatus. FIG. 14 is a left side view of the apparatus main body of the endoscope apparatus. FIG. 15 is a perspective view showing the configuration of a connector cover on an electric connector side as viewed from the front surface side. FIG. 16 is a perspective view showing the configuration of the connector cover on the electric connector side as viewed from the back surface side. FIG. 17 is a sectional view of the connector cover along the line XVII-XVII shown in FIG. 15. FIG. 18 is a perspective view showing a connector cover that is fixed to an exterior housing of the apparatus main body. FIG. 19 is a sectional view showing a state in which the connector cover is engaged with a concave portion of an electric connection portion. FIG. 20 is a plan view showing the configuration of a connector cover on a power source connector side as viewed from the front surface side. FIG. 21 is a plan view showing the configuration of the connector cover on a power source connector side as viewed from the back surface side. FIG. 22 is a sectional view of the connector cover that shows a section cut along a line XXII-XXII shown in FIG. 20. FIG. 23 is an exploded perspective view that shows the configuration of a connector cover according to a first modification example. FIG. 24 is an exploded perspective view that shows the configuration of a connector cover according to a second modification example. FIG. 25 is a sectional view in one direction of the connector cover shown in FIG. 24. FIG. 26 is a perspective view of the apparatus main body of the endoscope apparatus showing a state in which a lid for a battery is open. FIG. 27 is a perspective view that illustrates a distal end portion of an endoscope unit and a distal end adapter that is to be mounted on the distal end portion.

As shown in FIG. 1 and FIG. 2, an endoscope apparatus 1 that is an endoscope unit principally includes an endoscope unit (hereunder, referred to simply as "endoscope") 2 and an apparatus main body 3 to which the endoscope 2 is connected.

The endoscope 2 principally includes a long, thin and flexible insertion portion 20, an operation portion 21 that is connected to a proximal end side in the insertion direction of the insertion portion 20, and a connector box 40 (see FIG. 3 and FIG. 4) as a connector portion, described later, that is connected to an extension end of a universal cord 22 that is a flexible communication cable that extends from the operation portion 21. The endoscope 2 and the apparatus main body 3 are connected by means of the universal cord 22 and the connector box 40.

Inside the distal end portion of the insertion portion 20 is disposed an image pickup unit and the like that has an image pickup device such as a CCD that picks up an image of an inspection site and an objective optical system such as an objective lens. A distal end adapter 20a that is used for changing the optical performance is detachably mounted to the distal end portion of the insertion portion 20. The distal end adapter 20a is provided with a light source such as an LED that illuminates an inspection site (neither are shown). The image pickup unit or the light source may also be provided inside the operation portion 21 or inside an area (hereunder, referred to as "inside the apparatus main body 3") covered by the exterior housing 4 of the apparatus main body 3.

In the apparatus main body 3, a monitor 5 having an image display portion 8 such as an LCD (Liquid Crystal Display) that displays endoscopic images picked up by the image pickup unit of the endoscope 2 is fixed to an exterior housing 4 that has, for example, a box shape and is formed with a hard metal such as magnesium.

Specifically, the monitor 5 is fixed to the outer surface of the apparatus main body 3 via a rotational support portion 13 (see FIG. 3 and FIG. 5). An unshown stay is provided inside the rotational support portion 13. The monitor 5 is rotationally supported by the stay. More specifically, with respect to the connection between the stay and the monitor 5, for the monitor 5, a frame element formed with synthetic resin in which an image display portion 8 is provided is rotationally supported by the stay. Note that, image signals obtained by photoelectric conversion by the image pickup unit of the endoscope 2 are outputted to the monitor 5 via a communication cable 18 that extends from the apparatus main body 3 and is detachable from the monitor 5.

With respect to the monitor 5, when the endoscope apparatus 1 is to be used, the monitor surface 6 on which the image display portion 8 is provided and a rear surface portion 7 on the opposite side are rotated in a direction away from the connector box 40 (see FIG. 2 and FIG. 3), described later, that is mounted on the back surface side in FIG. 1 of the exterior housing 4 of the apparatus main body 3, and placed in a raised up state. When the endoscope apparatus 1 is not in use, the rear surface portion 7 of the monitor 5 is rotated and closed so as to be superimposed on the connector box 40.

A cover plate 9 that covers and protects the image display portion 8 when the endoscope apparatus 1 is not in used is fixed to the monitor surface 6 of the monitor 5. For the cover plate, a facing surface 10 of the cover plate 9 that faces the image display portion 8 is fixed to the monitor surface 6 so as to be capable of opening and closing with respect to the image display portion 8.

On the corners of the exterior housing 4 of the box-shaped apparatus main body 3 are fixed a plurality of leg portions 29 formed with a rubber such as NBR for placing the apparatus main body 3 thereon, and which constitute protectors for absorbing an impact to the exterior housing 4. These leg portions 29 are provided so that the apparatus main body 3 can be placed in a plurality of postures with respect to the ground surface.

As shown in FIG. 5, in the exterior housing 4 of the apparatus main body 3, a connector box housing chamber 45 (hereunder, simply referred to as "housing chamber") that is a concave, apparatus-side connector portion in which the connector box 40 is housed is provided on an outer surface 11 (see FIG. 3) side of the back surface side. The connector box housing chamber 45 is formed in substantially the same outer shape as the outer shape of the connector box 40.

Inside the housing chamber 45 are provided a plurality of slits 44 for allowing heat inside the housing chamber 45 to escape to inside the apparatus main body 3 that is covered by the exterior housing 4, and a convex electric connector 50 and the like (see FIG. 7) to which an unshown concave female connector 70 (see FIG. 8) of the connector box 40 is electrically connected.

As shown in FIG. 6, the exterior housing 4 also includes a handle portion 17 for handling on one side portion (upper side when viewed in the direction of the paper surface), and is fixed with a stay (not shown) provided in the rotational support portion 13 that rotationally supports the monitor 5 at this one side portion. Further, in the exterior housing 4, two monitor impact absorbing portions 14 and 15 that protrude from the side surface in which the housing chamber 45 is provided are integrally formed on the upper side that retains the stay and on the bottom side that is opposite thereto. That is, in the exterior housing 4, one surface side in which the housing chamber 45 is provided in formed in the shape of a concave portion.

In a state in which the monitor 5 is rotated and closed so as to be superimposed on the connector box 40, the monitor impact absorbing portions 14 and 15 protrude from the exterior housing 4 to prevent contact against the monitor 5. Each of these monitor impact absorbing portions 14 and 15 is a bracket portion for preventing the monitor 5 from falling off from the apparatus main body 3 when, for example, the force of an impact is applied to the apparatus main body 3 and contacts against the monitor 5 when the monitor 5 is in a stored state. Further, a concave portion 16 for inserting and arranging the universal cord 22 of the endoscope 2 is formed in the monitor impact absorbing portion 15.

As shown in FIG. 4, the connector box 40 that configures a connector portion of the endoscope 2 is a substantially box-shaped member fixed to a connector 23 provided at an extension end of the universal cord 22. The principal components of the connector box 40 include a box-shaped frame member 30 and a thin-plate shaped lid 31 that can be freely opened and closed with respect to an opening of the frame member 30.

In this case, two impact absorbing members 39 are provided on the front surface of the lid 31. These impact absorbing members 39 constitute monitor impact absorbing portions. The impact absorbing members 39 have a substantially cylindrical shape, and are formed with an elastic member such as rubber.

In each of the two impact absorbing members 39, in a state in which the monitor 5 is stored in the apparatus main body 3 when the endoscope apparatus 1 is not in use, a contacting surface 39a constituting a regulating surface that is the top surface that is parallel with the lid 31 facing the rear surface portion 7 that is one surface of the monitor 5, contacts against the rear surface portion 7 to retain the monitor 5. That is, the impact absorbing members 39 are members for absorbing the force of various impacts that are applied to the monitor 5 when the monitor 5 is stored in the apparatus main body 3.

In the lid 31 of the connector box 40, screws 38 are provided in the same number as an unshown plurality of threaded holes formed on a peripheral portion of a surface on the opposing side to the connector box housing chamber 45 of the frame member 30. The screws 38 can be engaged with and disengaged from the threaded holes by performing a screwing operation. Consequently, the lid 31 can be opened and closed with respect to the frame member 30.

Two latch portions 37 are provided on the two sides of the connector box 40 in a condition facing each other and protruding further than the front surface of the lid 31. In each latch portion 37 is formed a groove-shaped guide portion 37a that guides a claw portion 42 of a rotary fastener 41 that is provided in the exterior housing 4 as described later. The guide portions 37a are members for regulating the mounting direction to guide the claw portions 42 when mounting the connector box 40 to the exterior housing 4.

As shown in FIG. 5 and FIG. 6, the connector box 40 is mounted in the housing chamber 45 provided in the exterior housing 4 in which one side surface has a concave portion shape. That is, the connector box 40 has a configuration that is attachable and detachable with respect to the exterior housing 4 of the apparatus main body 3. The connector box 40 is mounted in the housing chamber 45 so as to cover the concave portion formed in one surface side of the exterior housing 4.

In a state in which the connector box 40 is mounted in the exterior housing 4, the front surface of the lid 31 constitutes a part of one surface of the exterior housing 4. That is, when the connector box 40 is mounted in the concave portion formed in one surface side of the exterior housing 4 to cover the concave portion, the front surface thereof constitutes a part of the exterior housing 4. Thus, when the connector box 40 is mounted in the exterior housing 4, the concavity and convexity of the exterior housing 4 is eliminated so that the exterior housing 4 forms a substantially box shape.

Further, in a state in which the connector box 40 is mounted in the exterior housing 4, four leg portions 29 positioned around the connector box 40 protrude further than the front surface of the connector box 40. Thus, the force of various impacts that are applied to the connector box 40 is absorbed by the four leg portions 29.

Furthermore, in a state in which the connector box 40 is mounted in the exterior housing 4, a connector 23 that serves as a connecting portion between the connector box 40 and the universal cord 22 is positioned within the above described one surface to which the connector box 40 is mounted in the exterior housing 4 (see FIG. 3).

Returning to FIG. 1, inside the apparatus main body 3 are provided electrical components other than the connector box 40, a recording medium that records image data that is subjected to image processing by a board for image processing, and a battery (see FIG. 24) described later that supplies power to the endoscope 2 and the apparatus main body 3, and the like.

As one example, the configuration allows a battery to be housed in a manner in which it is capable of being freely inserted to and withdrawn from an unshown battery housing chamber provided inside the apparatus main body 3 by employing a lid for a battery 27 that is provided so as to be capable of opening and closing by use of a hinge 28 with respect to a side surface of the exterior housing 4. Further, after the battery is inserted into and housed in the battery housing chamber, the lid for a battery 27 is locked by two fixing pins 26. Note that, since the layout configuration of contents inside the apparatus main body 3 other that the battery is a well known configuration, a description thereof is omitted herein.

The structure for making the apparatus main body 3 and the connector box 40 attachable and detachable with respect to each other will now be described in further detail using FIG. 6 to FIG. 8. Note that, the monitor 5 is not shown in FIG. 6.

In the above described housing chamber 45 for mounting and demounting the connector box 40 that is provided on one side surface of the exterior housing 4 of the apparatus main body 3 that is shown in FIG. 6, as shown in FIG. 7, a connector connection concave portion 46 that serves as a junction is provided as a depression in the direction of the inside of the apparatus main body 3 from a bottom surface serving as a mating surface in the concave portion of the connector box 40. Further, in the housing chamber 45, two long buffer portions 47 are provided in a parallel arrangement. The long buffer portions 47 are formed with an elastic member or the like for absorbing the force of an impact caused by contact with the connection surface of the connector box 40 to be connected on the bottom surface of the opening side.

The connector connection concave portion 46 has engaging convex portions 48 on side surface portions facing each other above and below as viewed in the direction of the sheet surface in this case. Two of the engaging convex portions 48 are provided or each side surface portion, respectively, in a condition in which they extend in the direction of the opening so as to sandwich the plurality of slits 44. The connector connection concave portion 46 also has concave portions 49 (only two are shown in FIG. 7) shaped with a rounded front surface that are disposed in the four corners on the bottom surface, an electric connector 50 disposed in substantially the center of the bottom surface, and two buffer portions 55 provided in the bottom surface so as to sandwich the electric connector 50. The buffer portions 55 have the same configuration as the above described buffer portions 47, and thus absorb the force of an impact caused by contact against the mating surface of the connector box 40.

The electric connector 50 includes a male connector 51 and a connector frame 52 that is provided so as to surround the male connector 51. The male connector 51 has protruding portions 53 that protrude in the direction of the opening of the connector connection concave portion 46 at both ends in the longitudinal direction.

The connector frame 52 also has guide protruding portions 54 that configure portions to be guided that protrude in the direction of the opening of the connector connection concave portion 46 at both ends in the longitudinal direction. Regarding the length relationship between the protruding portions 53 and the guide protruding portions 54, the guide protruding portions 54 protrude further in the direction of the opening of the connector connection concave portion 46. That is, the amount of protrusion of the guide protruding portions 54 from the bottom surface of the connector connection concave portion 46 is larger than that of the male connector 51.

Meanwhile, as shown in FIG. 8, the connector box 40 has a housing connection portion 61 on a side that connects to the housing chamber 45 of the apparatus main body 3. The housing connection portion 61 is substantially the same shape as the housing chamber 45 and protrudes so that the frame member 30 forms a box shape. The housing connection portion 61 has a connector connection convex portion 62 that serves as a junction and that protrudes from the surface in substantially the same shape as that of the connector connection concave portion 46 that is formed in the housing chamber 45 as described above.

In the housing connection portion 61, a plurality of slits 63 are formed on two opposing side surfaces of the connector connection convex portion 62. The plurality of slits 63 are provided for communicating with the slits 44 of the housing chamber 45 to discharge internal heat in a state in which the connector box 40 is connected to the housing chamber 45.

The connector connection convex portion 62 has a total of four guide grooves 64 disposed so as to sandwich each of the plurality of slits 63 on the two side surfaces and into which the engaging convex portions 48 of the connector connection concave portion 46 are engageably inserted, discoid buffer members 65 including an elastic member that are arranged at four corners on the surface and which engage with the concave portions 49 of the connector connection concave portion 46, and a female connector 70 disposed at substantially the center of the surface.

The female connector 70 is arranged so that a connector surface inside a concave portion 71 into which the male connector 51 on the apparatus main body 3 side is engageably inserted, that is formed in the connector connection convex portion 62 is located further on the inside than the surface of the connector connection convex portion 62. In the female connector 70, engaging holes 72 into which the protruding portions 53 of the male connector 51 are engageably inserted and engageable insertion guide holes 73 that are hole portions that allow the guide protruding portions 54 of the connector frame 52 of the male connector 51 to be guided and engageably inserted are respectively provided in parallel at both ends in the longitudinal direction.

In the exterior housing 4, waterproof packing 45a is arranged at the edge face of the periphery formed by the housing chamber 45 so as to surround the housing chamber 45 (see FIG. 7). In the connector box 40, a packing engaging groove 30a with which the above described waterproof packing 45a engages is formed in an edge face around the housing connection portion 61 of the frame member 30. Note that, conversely, the above described waterproof packing 45a may be provided at the edge of the frame member 30, and in this case the aforementioned packing engaging groove 30a is formed in the edge face of the exterior housing 4.

In the endoscope apparatus 1 of the present embodiment configured as described above, the connector box 40 of the endoscope 2 is mounted inside the housing chamber 45 of the apparatus main body 3 in the manner illustrated in the state shown in FIG. 10 from the state shown in FIG. 9. Thereafter, to reach the state shown in FIG. 3, the connector box 40 is housed and fixed by engaging the claw portions 42 of the two rotary fasteners 41 provided in the exterior housing 4 with the two latch portions 37 configuring the latch portions of the connector box 40 while pulling the connector box 40 to the housing chamber 45 side.

That is, the two rotary fasteners 41 form a configuration whereby the claw portions 42 protrude or are deeply inserted in accordance with rotation of the rotary lever. The rotary fasteners 41 constitute a lock mechanism that fixes the housing connection portion 61 of the connector box 40 while pulling the housing connection portion 61 towards a direction to house the housing connection portion 61 in the housing chamber 45 of the exterior housing 4 upon a user performing an operation that moves the claw portions 42 to the protrusion side to latch with the latch portions 37 and thereafter performs an operation that moves the claw portions 42 to the deep insertion side.

At this time, the waterproof packing 45a provided in the exterior housing 4 engages with and closely contacts the packing engaging groove 30a of the connector box 40. That is, the waterproof packing 45a engages with the packing engaging groove 30a upon the connector box 40 being pulled toward the exterior housing 4 side by the two rotary fasteners 41, so that the mutual mating surfaces of the exterior housing 4 and the connector box 40 are pressed together into intimate contact. Thus the dust-proof property and water-proof property of the connector box 40 is maintained at the connection with the exterior housing 4.

More specifically, the connector box 40 is pulled toward the exterior housing 4 side by the rotary fasteners 41 to be mounted in the exterior housing 4. Therefore, according to the endoscope apparatus 1 of the present embodiment, the waterproof packing 45a is provided on the mating surfaces of the exterior housing 4 with which the connector box 40 intersects in the mounting direction, and by the waterproof packing 45a engaging with and closely contacting the packing engaging groove 30a of the connector box 40, the connector box 40 and the exterior housing 4 are connected in a state in which water proofness is reliably maintained. As a result, in the endoscope apparatus 1, the connector box 40 is mounted in the exterior housing 4 in a state in which the dust-proof property and water-proof property are reliably maintained.

Further, when a user mounts the connector box 40 to the exterior housing 4 of the apparatus main body 3, as shown in FIG. 9 and FIG. 10, by aligning the connector connection convex portion 62 of the connector box 40 with the connector connection concave portion 46 of the housing chamber 45, the user can easily confirm the mounting direction. Thus, the endoscope apparatus 1 of the present embodiment has a configuration that enables a user to easily identify the direction for mounting the connector box 40 to the exterior housing 4 and that prevents erroneous mounting of the connector box 40 to the apparatus main body 3 by a user.

Further, a user may grip the two latch portions 37 of the connector box 40 in place of grip portions and align the guide portions 37a of the latch portions 37 with the claw portions 42 of the two rotary fasteners 41 to mount the connector box 40 to the exterior housing 4. At this time, since the guide portions 37a of the latch portions 37 guide the claw portions 42 of the rotary fastener 41, the connector box 40 can be smoothly mounted to the exterior housing 4.

Further, when mounting the connector box 40 in the exterior housing 4, the connection between the male connector 51 on the apparatus main body 3 side and the female connector 70 of the electric connector 50 on the connector box 40 side is made so as to enter the state shown in FIG. 11 from the state shown in FIG. 10.

More specifically, first the guide protruding portions 54 that protrude from the connector frame 52 of the male connector 51 are guided by the engageable insertion guide holes 73 on the female connector 70 side to be engageably inserted therein, so that the male connector 51 and the female connector 70 are facing at predetermined connection positions. Next the protruding portions 53 of the male connector 51 are engaged precisely in the engaging holes 72 on the female connector 70 side so that the male connector 51 and the female connector 70 are electrically connected in the state shown in FIG. 12. Note that, the guiding property is enhanced by adopting a configuration in which the guide protruding portions 54 are formed in a tapered shape so that the protruding side narrows and, in conformity therewith, the engageable insertion guide holes 73 expand toward the opening.

Furthermore, even if the connector box 40 is, for example, mounted by a user in a diagonal direction that is not the normal mounting direction to the housing chamber 45 of the exterior housing 4 of the apparatus main body 3, since the guide protruding portions 54 are protruding in the direction of the opening of the connector connection concave portion 46, the guide protruding portions 54 contact against the connector connection convex portion 62 of the connector box 40. Consequently, contact of the male connector 51 with the connector connection convex portion 62 is prevented by the guide protruding portion 54, and damage thereto is prevented without application of an unreasonable load.

As described in the foregoing, according to the endoscope apparatus 1 of the present embodiment, when mounting the connector box 40 of the endoscope unit 2 to the exterior housing 4 of the apparatus main body 3, it is possible to reliably connect the connector box 40 and the exterior housing 4 in a state that maintains watertightness thereof without mistaking the direction for mounting the connector box 40 to the exterior housing 4.

In the endoscope apparatus 1, in the connector connection concave portion 46 of the housing chamber 45, a connector arranged in the apparatus main body 3, in this case, the electric connector 50 on the male side is disposed so as not to protrude from the outer surface 11 of the exterior housing 4. Further, in this case the female connector 70 is arranged in the connector box 40 of the endoscope 2 that is mounted in the apparatus main body 3 and is disposed inside the concave portion 71 so as not to protrude from the front surface of the connector connection convex portion 62 of the housing connection portion 61, without having a protruding portion.

As a result, in a state in which the apparatus main body 3 and the connector box 40 of the endoscope 2 are separated from each other, when the apparatus main body 3 or the connector box 40 is transported or placed on a floor or the like by a user, damage to the connectors 50 and 70 due to a collision with other devices, or a wall, floor or equipment of a plant where the endoscope apparatus is used is prevented.

Further, according to the endoscope apparatus 1 of the present embodiment, a configuration is adopted in which guide protruding portions 54 guided by the engageable insertion guide holes 73 on the female connector side is provided to the connector frame 52 of the electric connector 50 so that the male connector 51 of the electric connector 50 on the apparatus main body 3 side and the female connector 70 on the connector box 40 side of the endoscope 2 face at definite positions to make an electrical connection.

As a result of the foregoing, according to the endoscope apparatus 1 of the present embodiment, a connecting portion between the endoscope 2 and the apparatus main body 3 has a dust-proof property and a water-proof property, as well as reliably connecting electrical connectors, and also can prevent damage to these connectors.

Note that, although in the above description a configuration is described in which the male connector 51 is provided on the apparatus main body 3 side and the female connector 70 is provided on the endoscope 2 side, naturally the reverse configuration may also be adopted.

In the endoscope apparatus 1 according to the present embodiment, various electric connector portions are arranged on the side surface portion of the exterior housing 4 of the apparatus main body 3. More specifically, in the present embodiment, when the direction in which the monitor 5 is folded is taken as the front, as shown in FIG. 13, two electric connector portions 56 are 57 provided vertically in a parallel arrangement on the right side surface portion of the exterior housing 4.

Of these electric connector portions 56 and 57, in the electric connector portion 56 on the upper side, at a bottom part of a concave portion 66 a card slot 24 is provided in an exposed condition to serve as an electrical contact portion into which a memory card such as a CF card (compact flash; registered trademark) or the like is removably inserted.

In the electric connector portion 57 on the lower side, at a bottom surface portion of the concave portion 67, a plurality of electric connectors 58 are provided in an exposed condition as an electrical contact portion, such as a Bayonet Neill Concelman connector (BNC connector) that has favorable high frequency properties and a Universal Serial Bus (USB connector) for connecting an external measuring instrument, a wireless device or a video device.

Meanwhile, as shown in FIG. 14, when the direction in which the monitor 5 is folded is taken to be the front, an electric connector portion 59 for a power source is provided at the lower part on the left side of the exterior housing 4. In the electric connector portion 59 is provided a DC jack 69 as an electric contact point portion for a DC power source. The DC jack 69 is formed in a concave shape from the bottom of the concave portion 68 in the direction towards the inside of the apparatus. Note that, although in the endoscope apparatus 1 the supply of power to the apparatus main body 3 is performed by a power source from the DC jack 69, charging of the aforementioned battery can also be performed using that power supply.

As shown in FIG. 6 (only the right side surface portion of the exterior housing 4 is shown in FIG. 6), for dust proofing and water proofing purposes, connector covers 74 and 75 (76: see FIG. 20) that are cover elements are provided in the electric connector portions 56, 57, and 59 in a condition in which they contact and press against the respective concave portions 66, 67, and 68 so as to seal the opening portion.

The configuration of the connector covers 74 and 75 will now be described first using FIG. 15 to FIG. 17. Note that, since the two connector covers 74 and 75 according to the present embodiment have the same configuration and only their sizes differ, the two connector covers 74 and 75 will be described at the same time.

As shown in FIG. 15 to FIG. 17, the connector cover 74 (75) according to the present embodiment principally includes a flexible plate element 81, a connecting plate portion 82, a packing portion 84, a rigid plate element 87, and two regulating block elements 89.

The flexible plate element 81 is formed with an elastic member such as a flexible synthetic resin or rubber. The connecting plate portion 82 is integrally formed from the side of the flexible plate element 81 so that the plate surfaces of each are at substantially right angles.

The packing portion 84 is a flexible portion that protrudes in the same direction as the extension direction of the connecting plate portion 82 along the edge of the flexible plate element 81 in an integral condition from one surface that serves as the back surface of the flexible plate element 81. The rigid plate element 87 is a rigid portion formed with a metal or a rigid synthetic resin and is provided on the other surface that serves as the front surface of the flexible plate element 81.

The two regulating block elements 89 are regulating members that are formed with a metal or a rigid synthetic resin, and are provided on both short sides inside a substantially cuboid concave portion formed by the hollow packing portion 84.

The flexible plate element 81 has two long holes 83 formed in the vicinity of one long side portion from which the connecting plate portion 82 extends at a right angle, and a finger engaging portion 86 provided at substantially the center of the other long side on the opposite side to the side on which the long holes 83 are formed. Further, two long screw holes 90 for fixing the connector cover 74 (75) to the exterior housing 4 are formed in the connecting plate portion 82.

In the packing portion 84, packing ribs 85 are formed that in this case are configured by three convex portions across the entire outside surface. A step portion 84a (see FIG. 17) is also formed in the packing portion 84. The step portion 84a is formed in a notched manner so that the wall thickness on the extension end side narrows.

The rigid plate element 87 is arranged on the front surface of the flexible plate element 81 in a state in which the surfaces of the rigid plate element 87 and the flexible plate element 81 are in contact. According to the present embodiment, the rigid plate element 87 and the two regulating block elements 89 are fixed to the flexible plate element 81 by screwing in a plurality of screws 88 in a state in which the rigid plate element 87 and the two regulating block elements 89 pinchingly support the flexible plate element 81. Further, a metal annular collar 91 is provided at each screw hole in the flexible plate element 81 for the penetrating screws 88 (see FIG. 17). The collars 91 are provided to prevent splitting of the screw holes in the flexible plate element 81.

Further, the screw holes formed in the regulating block elements 89 into which the screws 88 are screwed have a non-penetrating configuration to reliably maintain water proofness of the front surface of the rigid plate element 87 and the rear surface of the flexible plate element 81 to prevent moisture or the like entering therein.

Note that, a method of fixing the rigid plate element 87 and the two regulating block elements 89 is not limited to fixing with the screws 88. For instance, the rigid plate element 87 and the two regulating block elements 89 may be adhered to the flexible plate element 81 with an adhesive. Further, regarding the regulating block elements 89, three side surfaces thereof contact the surface of the packing portion 84 in a state in which they closely contact the inside surface in which one of the short sides and the two long sides of the packing portion 84 connect to form a horseshoe shape. Furthermore, in a state in which the rigid plate element 87 is disposed on the front surface of the flexible plate element 81, the packing portion 84 is provided so as to be positioned over the entire front surface detached with respect to the extending flexible plate element 81.

As shown in FIG. 18, the connector covers 74 and 75 configured as described above are fixed by screws 95 at respectively corresponding positions on the electric connector portions 56 and 57 in a state in which the connecting plate portion 82 is pressed by a plate element 94 on the back of the exterior housing 4 of the apparatus main body 3. As a result, the respective connector covers 74 and 75 can open and close freely with respect to opening portions of the concave portions 66 and 67 of the electric connector portions 56 and 57 provided on the side surface of the exterior housing 4.

Further, as described above, since the long holes 83 (see FIG. 15) are formed in the flexible plate element 81 at an edge portion adjacent to the connecting plate portion 82, the configuration is such that the connector covers 74 and 75 can be flexibly opened and closed. Note that, according to the present embodiment, since the surfaces of the flexible plate element 81 and the connecting plate portion 82 are at substantially a right angle to each other, a stress that energizes the flexible plate element 81 to the side of the electric connector portions 56 and 57 is constantly being applied to the flexible plate element 81 by its own elastic force.

As shown in FIG. 6, when the endoscope apparatus 1 is not in use and the like, the connector covers 74 and 75 that are fixed in this manner to the exterior housing 4 of the apparatus main body 3 are closed in a state that maintains the dust-proof property and water-proof property of the concave portions 66 and 67 of the electric connector portions 56 and 57.

Before use or even during use of the endoscope apparatus 1, when a CF card or the like is to be inserted into the card slot 24 of the electric connector portion 56 or when a cable or the like is to be inserted and connected to the electric connector 58, the user engages the finger with the finger engaging portion 86 (see FIG. 15) to open the connector cover 74 or 75 so as to expose the opening portion of the concave portions 66 and 67 of each connector portion 56 and 57 as shown in FIG. 13 and FIG. 18.

Thereafter, after use or even during use of the endoscope apparatus 1, the connector covers 74 and 75 are closed towards the side surface of the exterior housing 4 so as to block up the opening portions of the concave portions 66 and 67 of the electric connector portions 56 and 57 from which the cable or the like has been removed.

At this time, the user presses the surface of the rigid plate element 87 of the connector covers 74 and 75 towards the electric connector portions 56 and 57. Thereupon, packing portion 84 of the connector covers 74 and 75 is engageably inserted into the concave portions 66 and 67 of the electric connector portions 56 and 57.

A state in which the connector cover 74 is engageably inserted into the concave portion 67 of the electric connector portion 57 is now described below using FIG. 19. Note that, in the following description, only a view illustrating the action of the connector cover 74 is shown in FIG. 19, and the connector cover 75 that has the same configuration is not illustrated and a description of the action of the connector cover 75 is omitted.

As shown in FIG. 19, when the surface of the rigid plate element 87 of the connector cover 74 is pressed by the user, the packing portion 84 is engageably inserted into the concave portion 67 of the electric connector portion 57. At this time, regardless of which position on the surface of the rigid plate element 87 of the connector cover 74 is pressed by the user, a uniform pressing force is applied to the flexible plate element 8 by the surface of the rigid plate element 87.

That is, the external dimensions of the rigid plate element 87 of the connector cover 74 are designed to be larger than the external shape of the packing portion 84 so that all of the packing portion 84 provided on the detached surface of the flexible plate element 81 is covered via the flexible plate element 81. Consequently, the rigid plate element 87 presses the flexible plate element 81 with a uniform contact pressure, and in accompaniment therewith the entire packing portion 84 receives the pressing force and is engageably inserted into the concave portion 67.

As a result, the packing portion 84 is engageably inserted in a closely contacting condition into the concave portion 67 of the electric connector portion 57 in a reliable manner without twisting the flexible plate element 81 and the packing portion 84. In this state, the packing ribs 85 formed on the peripheral surface of the packing portion 84 are pressed in contact against the inner wall of the concave portion 67.

The two regulating block elements 89 of the connector cover 74 regulate changes in shape of the packing portion 84 and, together with the inner wall of the concave portion 67 sandwich and support the packing portion 84. That is, the packing portion 84 enters a state in which the packing portion 84 is sandwiched by the two regulating block elements 89 and the inner wall of the concave portion 67 so that the packing ribs 85 enter a state in which they are reliably pressed in contact with the wall surface of the concave portion 67.

As a result, the concave portion 67 of the electric connector portion 57 is covered in a completely dustproof state and waterproof state by the connector cover 74. Accordingly, dirt, dust, moisture and the like are prevented from entering the concave portion 67, and since the opening portion thereof is completely sealed, the plurality of electric connectors 58 that are arranged on the inside are in a sealed state. Note that, since the packing portion 84 has a step portion 84a (see FIG. 17) at which the wall thickness at an end section on the bottom surface side on which the electric connector 58 of the concave portion 67 is disposed that serves as an extension end is thinly formed, when the connector cover 74 is to be closed, the connector cover 74 is engageably inserted in a smooth manner into the concave portion 67.

As described above, according to the configuration of the connector cover 74 (75) of the present embodiment, the packing ribs 85 of the packing portion 84 that is engageably inserted into the concave portion 67 (66) of the electric connector portion 57 (56) are pressed in contact against the inner wall surface of the concave portion 67 (66) and attached closely thereto to thereby enhance the dust-proof property and water-proof property of the connector cover 74 (75).

Note that, a connector cover 76 as shown in FIG. 20 to FIG. 22 is provided in the electric connector portion 59 for a power source that is provided at the lower part of the right side surface portion of the exterior housing 4 shown in FIG. 14.

As shown in FIG. 20 and FIG. 21, the connector cover 76 includes a substantially tabular elastic member in which a flexible plate element 101 having a finger engaging portion 104 on one side portion and a connecting plate portion 102 are connected, and has a long hole 103 at the boundary between the flexible plate element 101 and the connecting plate portion 102.

As shown in FIG. 22, the flexible plate element 101 has a packing portion 115 constituting a flexible portion in which three packing ribs 116 that protrude in an integral condition from the back surface are formed on the outside surface. A rigid plate element 105 constituting a rigid portion made of metal or a rigid synthetic resin is provided on the front surface of the flexible plate element 101. A regulating plate 111 constituting a regulating member made of metal or a rigid synthetic resin is provided inside a concave portion formed by the packing portion 115 on the back surface of the flexible plate element 101. The rigid plate element 106 and the regulating plate 111 are fixed to each other by two screws 106 so as to sandwich the flexible plate element 101.

Further, on the connecting plate portion 102 are provided a plate element 107 that uses a surface to press and fix the front surface of the electric connector portion 59 (see FIG. 14) of the exterior housing 4 on the front surface, and two screws 108 for fixing the plate element 107 to the electric connector portion 59.

Although the connector cover 76 that is provided in the electric connector portion 59 for a power source has substantially the same configuration as the above described connector covers 74 and 75, since the size of the connector cover 76 is smaller than that of the connector covers 74 and 75, the regulating plate 111 that is simply a rigid plate element is provided on the back surface of the flexible plate element 101 and not the block elements 89. That is, the flexible plate element 101 is arranged in a state in which the flexible plate element 101 is sandwiched by the rigid plate element 105 on the front surface and the regulating plate 111 that has the same external shape as the concave portion formed by the packing portion 115 on the back surface. Further, in this case also, the external shape part of the rigid plate element 105 is designed to be larger than the external shape of the packing portion 115.

Note that, the rigid plate element 105 and the regulating plate 111 are fixed to each other by screws 106 being screwed directly into penetrating screw holes that are provided with a collar 91 and that are formed in the regulating plate 111, to sandwich the flexible plate element 101 in a closely contacting condition. Further, after the screws 106 screw into the penetrating screw holes at the front surface side of the regulating plate 111 (back surface side of the flexible plate element 101), the penetrating screw holes are hermetically sealed with adhesive 112. Thus, entry of moisture or the like from the front surface side of the rigid plate element 105 through the screws 106 is reliably prevented.

The connector cover 76 configured in this manner is fixed to the electric connector portion 59, and similarly to the above described connector covers 74 and 75, the packing portion 115 is engageably inserted in a closely contacting condition into the concave portion 68 in which the DC jack 69 is disposed on the bottom surface, and the packing ribs 116 closely contact the side walls of the concave portion 68. When the connector cover 76 is closed on the electric connector portion 59 of the exterior housing 4, the regulating plate 111 is in a state in which the regulating plate 111 sandwiches the packing portion 115 together with the side walls of the concave portion 68. Thus, since the packing ribs 116 change shape to make close contact with the wall surface of the concave portion 68, a dust-proof structure and water-proof structure can be reliably realized on the inside of the concave portion 68 of the electric connector portion 59.

Further, even when one section of its front surface is pressed, the rigid plate element 105 presses the flexible plate element 101 with its surface, and the external section thereof also presses the packing portion 115 of the flexible plate element 101 towards the concave portion 68 of the electric connector portion 59. Consequently, the packing portion 115 is engaged with the concave portion 68 of the electric connector portion 59 without any twisting of the flexible plate element 101 and the packing portion 115.

Accordingly, the endoscope apparatus 1 of the present embodiment has a configuration in which a dust-proof and water-proof structure is definitely realized for the electric connector portions 56, 57, and 59 provided on the exterior housing 4 of the apparatus main body 3 by means of the configuration of the connector covers 74, 75, and 76 described above.

Note that, as shown in FIG. 23, the rigid plate element 121 may have a configuration in which the center is hollowed out to form a hole 121*a*. That is, it is sufficient that the rigid plate element 121 has a width that can adequately apply a pressing force to the packing portion 123 via the flexible plate element 122 at an exterior section. It is therefore possible to make the rigid plate element 121 lightweight, so that the connector covers 74, 75, and 76 are lightweight overall.

Further, the center of the regulating plate 125 may also be hollowed out to form a hole 125*a*. That is, it is sufficient that the regulating plate 125 has enough rigidity to regulate a change in shape in the internal direction of the packing portion 123. It is therefore possible to also make the regulating plate 125 lightweight, so that the connector covers 74, 75, and 76 become further lightweight.

The rigid plate element 121 and the regulating plate 125 may be respectively fixed with adhesive to the flexible plate element 122 or may be fixed by screws in a condition in which they together sandwich and support the flexible plate element 122.

Further, as shown in FIG. 24 and FIG. 25, the connector covers 74, 75, and 76 may also have a configuration in which a regulating protrusion 127 is integrally provided on the rigid plate element 126 and only a packing portion 124 is adhered to the side wall of the regulating protrusion 127. By adopting this configuration, in a case where the dust-proof property and water-proof property of the connector covers 74, 75, and 76 decline, the dust-proof property and water-proof property can be restored by replacing only the depleted packing portion 124. Note that, according to this configuration, a hinge mechanism 128 is provided on the rigid plate element 126 to make the connecting plate portion 129 rotatable.

Further, as shown in FIG. 26, in the endoscope apparatus 1 according to the present embodiment, a battery 130 that supplies power is provided inside the apparatus main body 3. This battery is housed inside a battery housing chamber 131 in the exterior housing 4, and a lid for a battery 27 that is capable of opening and closing shuts the opening portion of the battery housing chamber 131.

Further, on the outer surface of the apparatus main body 3, a packing 132 for dust proofing and water proofing is provided around the periphery of the battery housing chamber 131. Note that, the packing 132 may be provided on the lid for a battery 127 side.

In the endoscope apparatus 1 of the present embodiment, after the battery 130 is inserted and housed in the battery housing chamber 131 provided in the exterior housing 4 of the apparatus main body 3, the lid for a battery 27 is locked by two fixing pins 26. Thus, the endoscope apparatus 1 has a configuration in which the dust-proof property and water-proof property of the battery housing chamber 131 that houses the battery 130 are maintained. That is, the exterior housing 4 of the apparatus main body 3 has a configuration in which the dust-proof property and water-proof property of the battery housing chamber 131 that houses the battery 130 are maintained.

Furthermore, as shown in FIG. 1, the endoscope 2 of the endoscope apparatus 1 according to the present embodiment has a configuration that maintains a dust-proof property and a water-proof property at a joint with the detachable distal end adapter 20a at the distal end portion of the insertion portion 120. More specifically, as shown in FIG. 27, the distal end portion of the insertion portion 120 is provided with an O-ring 135 constituting a waterproof packing at a peripheral portion over which the distal end adapter 20a is externally fitted. That is, by close contact of the O-ring 135 with the inside perimeter portion of the distal end adapter 20a that is mounted at the peripheral portion of the distal end portion of the insertion portion 120, the dust-proof property and water-proof property are maintained.

Thus, according to the endoscope apparatus 1 of the present embodiment, the connector box 40 of the endoscope 2 can be mounted to the exterior housing 4 of the apparatus main body 3 in a state in which a dust-proof property and a water-proof property are maintained, and the joint of the distal end adapter 2a that is mounted to the insertion portion 20 of the endoscope 2 also has a configuration in which a dust-proof property and a water-proof property are maintained. Further, on the apparatus main body 3 of the endoscope apparatus 1, a dust-proof property and a water-proof property of each of the electric connector portions 57, 56, and 59 that are arranged on the exterior housing 4 can be maintained by the connector covers 74, 75, and 76, respectively, and the battery housing chamber 131 also has a configuration in which a dust-proof property and a water-proof property are maintained by the lid for a battery 27.

As the result of the foregoing, even when the endoscope apparatus 1 according to the present embodiment is used in a location that is exposed to dirt, rain, humidity and the like in a state in which the endoscope 2 is mounted thereto, the configuration of the endoscope apparatus 1 maintains a dust-proof property and a water-proof property so that moisture does not penetrate inside the apparatus main body 3 and the entry of dust and the like is completely prevented.

Note that, although it is preferable that both a water-proof property and a dust-proof property are maintained at each junction described above, a configuration may also be adopted that maintains either a water-proof property or a dust-proof property.

The present invention which has been described by way of the above embodiment is not limited to the embodiment and the modified examples, and various modifications can be made to the above described embodiment in practicing without departing from the scope of the present invention. In addition, since the above described embodiment includes some inventions at different stages, a plurality of constituent features disclosed herein may be conveniently combined to extract different inventions.

For example, if the above described problems to be solved by the present invention can be resolved and also the above described effects can be obtained even when some constituent features are omitted from all of the constituent features included in the embodiment, the structure without the omitted constituent features may be extracted as an invention.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An endoscope apparatus, including:
   an apparatus main body comprising a housing having a recessed housing chamber formed in one surface, the recessed housing chamber having a bottom and four sides;
   a monitor provided in a rotatable condition on the housing and which is stored in the apparatus main body; and
   an endoscope unit comprising a connector portion mountable in the recessed housing chamber, when the connector portion is mounted to the recessed housing chamber, the connector portion constituting a part of the one surface,
   wherein the monitor is stored in the housing so as to cover the connector portion when the connector portion is mounted in the recessed housing chamber, so as to enclose the connector portion between a surface of the monitor and the recessed housing chamber, and
   a surface of the connector portion, perpendicular to a mounting direction, and a viewing surface of the monitor are arranged parallel when the monitor is stored in the housing.

2. An endoscope apparatus, including:
   an apparatus main body comprising a housing having a recessed housing chamber formed in one surface, the recessed housing chamber having a bottom and at least two sides;
   a monitor provided in a rotatable condition on the housing and which is stored in the apparatus main body; and
   an endoscope unit comprising a connector portion mountable in the recessed housing chamber, when the connector portion is mounted to the recessed housing chamber, the connector portion constitutes a part of the one surface,
   wherein the monitor is stored in the housing so as to cover the connector portion when the connector portion is mounted in the recessed housing chamber, so as to enclose the connector portion between a surface of the monitor and the recessed housing chamber; and
   a surface of the connector portion perpendicular to a mounting direction and a viewing surface of the monitor are arranged parallel when the monitor is stored in the housing.

3. The endoscope apparatus according to claim 2, wherein, a packing that maintains mutual mating surfaces of the recessed housing chamber and the connector portion in a closely contacting state when the connector portion is mounted in the recessed housing chamber is provided in the housing or the connector portion.

4. The endoscope apparatus according to claim 3, wherein, the packing is provided on the mating surface that intersects in a mounting direction of the connector portion and the housing.

5. The endoscope apparatus according to claim 4, wherein: a latch portion is provided to the connector portion; and in the housing is provided a lock mechanism that latches onto the latch portion and pulls the connector portion to the housing side so that the packing is in close contact with the mating surface.

6. The endoscope apparatus according to claim 5, wherein: two of the latch portions are provided at mutually opposing positions on the connector portion; and
   two of the lock mechanisms that latch onto the two latch portions, respectively, are provided at mutually opposing positions on the housing.

7. The endoscope apparatus according to claim 6, wherein: a guide portion that guides the lock mechanism to the latch portion and regulates a mounting direction of the connector portion is provided to the housing.

8. The endoscope apparatus according to claim 6, wherein: a convex-shaped engaging portion is provided on the mating surface side of the connector portion; and a concave-shaped portion to be engaged in which the engaging portion is housed is provided to the housing.

9. The endoscope apparatus according to claim 2, further including:
a monitor provided in a rotatable condition on the housing and which is stored in the apparatus main body;
wherein the monitor is stored in the housing so as to cover the connector portion when the connector portion is mounted in the recessed housing chamber, so as to enclose the connector portion between a surface of the monitor and the recessed housing chamber; and
a surface of the connector portion perpendicular to a mounting direction and a viewing surface of the monitor are arranged parallel when the monitor is stored in the housing.

10. The endoscope apparatus according to claim 3, wherein:
an electric connector portion comprising an electric connector that is connected to an external device is provided to the housing; and
a cover element that maintains the electric connector portion in a water-tight state is removably provided to the housing.

11. The endoscope apparatus according to claim 10, wherein:
a battery housing portion that houses a detachable battery is provided in the housing; and
a lid is provided that retains the battery housing portion in a closely contacting state.

12. The endoscope apparatus according to claim 10, wherein:
the endoscope unit comprises a distal end adapter that is detachably mounted to an insertion portion distal end portion; and
a waterproofing member is provided that maintains water-tightness between the insertion portion distal end portion and the distal end adapter.

13. The endoscope apparatus according to claim 10, wherein, the cover element includes:
a packing portion that is engageably inserted into the electric connector portion; and
a rigid portion that is provided in a fixed condition on the packing portion and has an external shape that is larger than an external shape of the packing portion.

14. The endoscope apparatus according to claim 13, wherein:
the packing portion has a concave shape; and
a rigid regulating member is provided that regulates an elastic change in shape to an inner side of the packing portion within the concave shape so as to contact against at least three inner surfaces of the packing portion.

15. The endoscope apparatus according to claim 13, wherein, the rigid portion is formed by a plate element.

16. The endoscope apparatus according to claim 14, wherein, the regulating member is formed by two block elements.

17. The endoscope apparatus according to claim 14, wherein, the regulating member is formed by a plate element.

18. The endoscope apparatus according to claim 2, wherein, a protector that surrounds the recessed housing chamber and protrudes more than an outer surface of the connector portion that is mounted to the recessed housing chamber is provided to the housing.

19. The endoscope apparatus according to claim 2, wherein:
the endoscope unit comprises an endoscope and a cable that connects the endoscope and the connector portion; and
in a state in which the connector portion is mounted to the housing, a connection position of the cable with the connector portion is provided inside the recessed housing chamber.

20. The endoscope apparatus according to claim 2, wherein the at least two sides comprises four sides.

21. The endoscope apparatus according to claim 2, wherein the connector portion has an outside surface which is substantially disposed in a same plane with the one surface when the connector portion is mounted to the recessed housing chamber.

* * * * *